United States Patent
Kim et al.

(10) Patent No.: US 11,515,979 B2
(45) Date of Patent: Nov. 29, 2022

(54) METHOD FOR TRANSMITTING AND RECEIVING PHASE TRACKING REFERENCE SIGNAL IN WIRELESS COMMUNICATION SYSTEM, AND APPARATUS THEREFOR

(71) Applicant: LG ELECTRONICS INC., Seoul (KR)

(72) Inventors: Kyuseok Kim, Seoul (KR); Hyungtae Kim, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/711,289

(22) Filed: Apr. 1, 2022

(65) Prior Publication Data
US 2022/0224482 A1    Jul. 14, 2022

Related U.S. Application Data

(63) Continuation of application No. PCT/KR2020/013516, filed on Oct. 5, 2020.

(30) Foreign Application Priority Data

Oct. 3, 2019  (KR) .......... 10-2019-0122728
Nov. 8, 2019  (KR) .......... 10-2019-0143040

(51) Int. Cl.
*H04W 72/12*  (2009.01)
*H04L 5/00*   (2006.01)

(52) U.S. Cl.
CPC ....... *H04L 5/0048* (2013.01); *H04W 72/1289* (2013.01)

(58) Field of Classification Search
CPC ................. H04W 72/12; H04L 5/00
See application file for complete search history.

(56) References Cited

U.S. PATENT DOCUMENTS

2013/0279439 A1  10/2013 Takahashi et al.
2019/0166615 A1   5/2019 Nimbalker et al.

FOREIGN PATENT DOCUMENTS

KR    20190101454    8/2019

OTHER PUBLICATIONS

3GPP, "3rd Generation Partnership Project; Technical Specification Group Radio Access Network; NR; Physical layer procedures for data (Release 15)," TS 38.214 V15.7.0, Sep. 2019, 106 pages.

(Continued)

*Primary Examiner* — Khaled M Kassim
*Assistant Examiner* — Zhaohui Yang
(74) *Attorney, Agent, or Firm* — Fish & Richardson P.C.

(57) ABSTRACT

A method for receiving a PTRS by a user equipment (UE) in a wireless communication system may comprise the steps of: receiving first information for configuring one or more bandwidth parts (BWPs); receiving second information including threshold value information relating to a frequency density of a PTRS; receiving downlink control information (DCI), wherein the DCI includes a first field indicating an activated BWP among the one or more BWPs configured on the basis of the first information, and a second field related to a transmission configuration indication (TCI) state; and receiving the PTRS in the activated BWP, wherein the frequency density of the PTRS is determined by the number of resource blocks associated with each TCI state.

15 Claims, 21 Drawing Sheets

(56) References Cited

OTHER PUBLICATIONS

International Search Report in International Appln. No. PCT/KR2020/013501, dated Jan. 5, 2021, 4 pages.
LG Electronics, "Enhancements on multi-TRP/panel transmission," R1-1908699, Presented at 3GPP TSG RAN WG1 Meeting #98, Prague, CZ, Aug. 26-30, 2019, 19 pages.

* FRG : frequency resource group

* FRG : frequency resource group

METHOD FOR TRANSMITTING AND RECEIVING PHASE TRACKING REFERENCE SIGNAL IN WIRELESS COMMUNICATION SYSTEM, AND APPARATUS THEREFOR

CROSS-REFERENCE TO RELATED APPLICATIONS

Pursuant to 35 U.S.C. § 119(e), this application is a continuation of International Application No. PCT/KR2020/013516, filed on Oct. 5, 2020, which claims the benefit of Korean Application No. 10-2019-0122728, filed on Oct. 3, 2019 and Korean Application No. 10-2019-0143040, filed on Nov. 8, 2019, the contents of which are all hereby incorporated by reference herein in their entirety.

TECHNICAL FIELD

The present disclosure relates to a wireless communication system, and more particularly to a method of transmitting and receiving a phase tracking reference signal (PTRS) considering joint transmission of multiple transmission reception points (TRPs) and a device supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

SUMMARY

The present disclosure provides a method of transmitting and receiving, by a user equipment (UE) supported by multiple transmission reception points (TRPs), a phase tracking reference signal (PTRS) in a wireless communication system.

More specifically, the present disclosure provides a method of allocating time/frequency resources for each TRP considering single DCI based M-TRP transmission.

The present disclosure also provides a method of determining a reference resource size for calculating a size of a transport block transmitted from each TRP considering single DCI based M-TRP transmission.

The present disclosure also provides a method of determining a frequency density of a PTRS considering M-TRP transmission.

The present disclosure also provides a resource mapping method of transmitting a PTRS in time/frequency resources allocated for each TRP.

The technical objects to be achieved by the present disclosure are not limited to those that have been described hereinabove merely by way of example, and other technical objects that are not mentioned can be clearly understood from the following descriptions by those skilled in the art, to which the present disclosure pertains.

In one aspect of the present disclosure, there is provided a method of receiving, by a user equipment (UE), a phase tracking reference signal (PTRS) in a wireless communication system, the method comprising receiving first information configuring one or more bandwidth parts (BWPs); receiving second information including threshold information for a frequency density of the PTRS; receiving downlink control information (DCI), wherein the DCI includes a first field indicating an active BWP among the one or more BWPs configured based on the first information and a second field related to a transmission configuration indication (TCI) state; and receiving the PTRS in the active BWP, wherein based on (i) a plurality of TCI states being indicated based on the second field and (ii) non-overlapping resources in a frequency domain related to each TCI state of the plurality of TCI states, the frequency density of the PTRS is determined by (i) a number of resource blocks related to each TCI state and (ii) the threshold information included in the second information.

The threshold information included in the second information may include a first threshold and a second threshold. The frequency density of the PTRS may be determined by comparing (i) the number of resource blocks related to each TCI state and (ii) at least one of the first threshold or the second threshold.

Each of the first threshold and the second threshold may be set as a plurality of values.

The DCI may include a third field for a resource allocation of the frequency domain. Frequency resources allocated based on the third field may be divided into non-overlapping resource groups corresponding to a number of the plurality of TCI states.

Each resource group may correspond to each TCI state.

Based on two TCI states being indicated based on the second field, the allocated frequency resources may be divided into a first resource group and a second resource group that do not overlap. The first resource group may be related to a first TCI state, and the second resource group may be related to a second TCI state.

Each resource group may include one or more resource blocks. A first frequency density of the PTRS may be determined by a number of resource blocks of the first resource group, and a second frequency density of the PTRS may be determined by a number of resource blocks of a second region.

The PTRS may be mapped to a resource element based on the first frequency density in the first resource group, and the PTRS may be mapped to a resource element based on the second frequency density in the second resource group.

The DCI may further include a fourth field for a DMRS port indication, and DMRS ports indicated based on the fourth field may be included in the same CDM group.

In another aspect of the present disclosure, there is provided a user equipment (UE) receiving a phase tracking reference signal (PTRS) in a wireless communication system, the UE comprising one or more transceivers; one or more processors; and one or more memories configured to store instructions for operations executed by the one or more processors, the one or more memories being connected to the one or more processors, wherein the operations comprise receiving first information configuring one or more bandwidth parts (BWPs); receiving second information including threshold information for a frequency density of the PTRS;

receiving downlink control information (DCI), wherein the DCI includes a first field indicating an active BWP among the one or more BWPs configured based on the first information and a second field related to a transmission configuration indication (TCI) state; and receiving the PTRS in the active BWP, wherein based on (i) a plurality of TCI states being indicated based on the second field and (ii) non-overlapping resources in a frequency domain related to each TCI state of the plurality of TCI states, the frequency density of the PTRS is determined by (i) a number of resource blocks related to each TCI state and (ii) the threshold information included in the second information.

In another aspect of the present disclosure, there is provided a method of transmitting, by a base station (BS), a phase tracking reference signal (PTRS) in a wireless communication system, the method comprising transmitting, to a user equipment (UE), first information configuring one or more bandwidth parts (BWPs); transmitting, to the UE, second information including threshold information for a frequency density of the PTRS; transmitting, to the UE, downlink control information (DCI), wherein the DCI includes a first field indicating an active BWP among the one or more BWPs configured based on the first information and a second field related to a transmission configuration indication (TCI) state; and transmitting, to the UE, the PTRS in the active BWP, wherein based on (i) a plurality of TCI states being indicated based on the second field and (ii) non-overlapping resources in a frequency domain related to each TCI state of the plurality of TCI states, the frequency density of the PTRS is determined by (i) a number of resource blocks related to each TCI state and (ii) the threshold information included in the second information.

In another aspect of the present disclosure, there is provided a base station (BS) transmitting a phase tracking reference signal (PTRS) in a wireless communication system, the base station comprising one or more transceivers; one or more processors; and one or more memories configured to store instructions for operations executed by the one or more processors, the one or more memories being connected to the one or more processors, wherein the operations comprise transmitting, to a user equipment (UE), first information configuring one or more bandwidth parts (BWPs); transmitting, to the UE, second information including threshold information for a frequency density of the PTRS; transmitting, to the UE, downlink control information (DCI), wherein the DCI includes a first field indicating an active BWP among the one or more BWPs configured based on the first information and a second field related to a transmission configuration indication (TCI) state; and transmitting, to the UE, the PTRS in the active BWP, wherein based on (i) a plurality of TCI states being indicated based on the second field and (ii) non-overlapping resources in a frequency domain related to each TCI state of the plurality of TCI states, the frequency density of the PTRS is determined by (i) a number of resource blocks related to each TCI state and (ii) the threshold information included in the second information.

In another aspect of the present disclosure, there is provided a device comprising one or more memories; and one or more processors operatively connected to the one or more memories, wherein the one or more processors are configured to allow the device to receive first information configuring one or more bandwidth parts (BWPs); receive second information including threshold information for a frequency density of the PTRS; receive downlink control information (DCI), wherein the DCI includes a first field indicating an active BWP among the one or more BWPs configured based on the first information and a second field related to a transmission configuration indication (TCI) state; and receive the PTRS in the active BWP, wherein based on (i) a plurality of TCI states being indicated based on the second field and (ii) non-overlapping resources in a frequency domain related to each TCI state of the plurality of TCI states, the frequency density of the PTRS is determined by (i) a number of resource blocks related to each TCI state and (ii) the threshold information included in the second information.

In another aspect of the present disclosure, there is provided one or more non-transitory computer readable mediums storing one or more instructions, wherein the one or more instructions executable by one or more processors allow a user equipment (UE) to receive first information configuring one or more bandwidth parts (BWPs); receive second information including threshold information for a frequency density of the PTRS; receive downlink control information (DCI), wherein the DCI includes a first field indicating an active BWP among the one or more BWPs configured based on the first information and a second field related to a transmission configuration indication (TCI) state; and receive the PTRS in the active BWP, wherein based on (i) a plurality of TCI states being indicated based on the second field and (ii) non-overlapping resources in a frequency domain related to each TCI state of the plurality of TCI states, the frequency density of the PTRS is determined by (i) a number of resource blocks related to each TCI state and (ii) the threshold information included in the second information.

Embodiments of the present disclosure can transmit and receive a phase tracking reference signal (PTRS) based on multiple transmission reception points (TRPs).

Embodiments of the present disclosure can determine time/frequency resources for each TRP based on time/frequency resources configured via DCI in single DCI based M-TRP transmission. Embodiments of the present disclosure can also determine a reference resource size for calculating a size of a transport block transmitted from each TRP.

Embodiments of the present disclosure can configure optimization of a frequency density of a PTRS considering M-TRP transmission. Embodiments of the present disclosure can also transmit and receive a PTRS mapped to a resource element based on a determined frequency density.

Effects which may be obtained from the present disclosure are not limited by the above effects, and other effects that have not been mentioned may be clearly understood from the following description by those skilled in the art to which the present disclosure pertains.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

DETAILED DESCRIPTION

Figure 1:
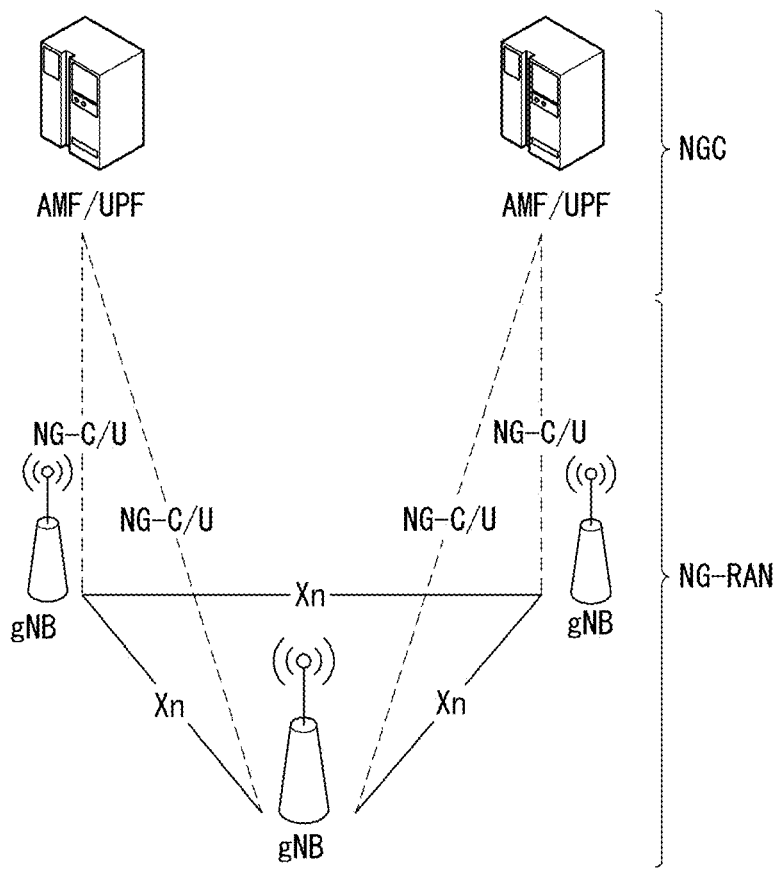
FIG. 1 is a diagram illustrating an example of an overall system structure of NR to which a method proposed in the present disclosure may be applied.

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain.

Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}s=480 \cdot 10^3$ and $N_f=4096$. DL and UL transmission is configured as a radio frame having a section of $T_f=(\Delta f_{max}N_f/100) \cdot T_s=10$ ms. The radio frame is composed of ten subframes each having a section of $T_{sf}=(\Delta f_{max}N_f/1000) \cdot T_s=1$ ms In this case, there may be a set of UL frames and a set of DL frames.

Figure 2:
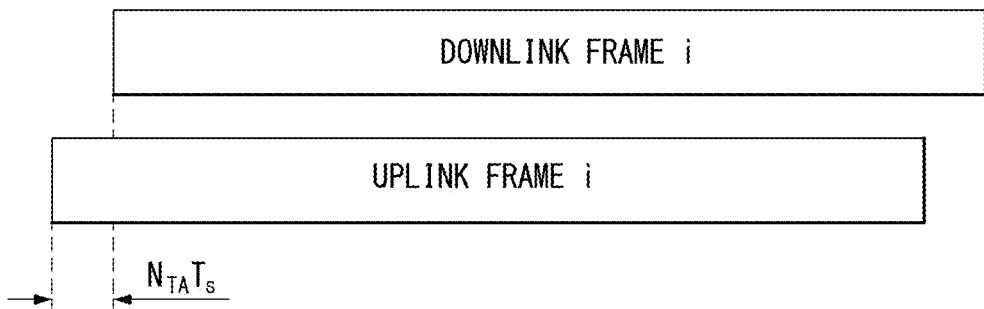
FIG. 2 illustrates a relationship between an uplink frame and a downlink frame in a wireless communication system to which a method proposed in the present disclosure may be applied.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology µ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{subframe}^{slots,\mu}-1\}$ frame within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
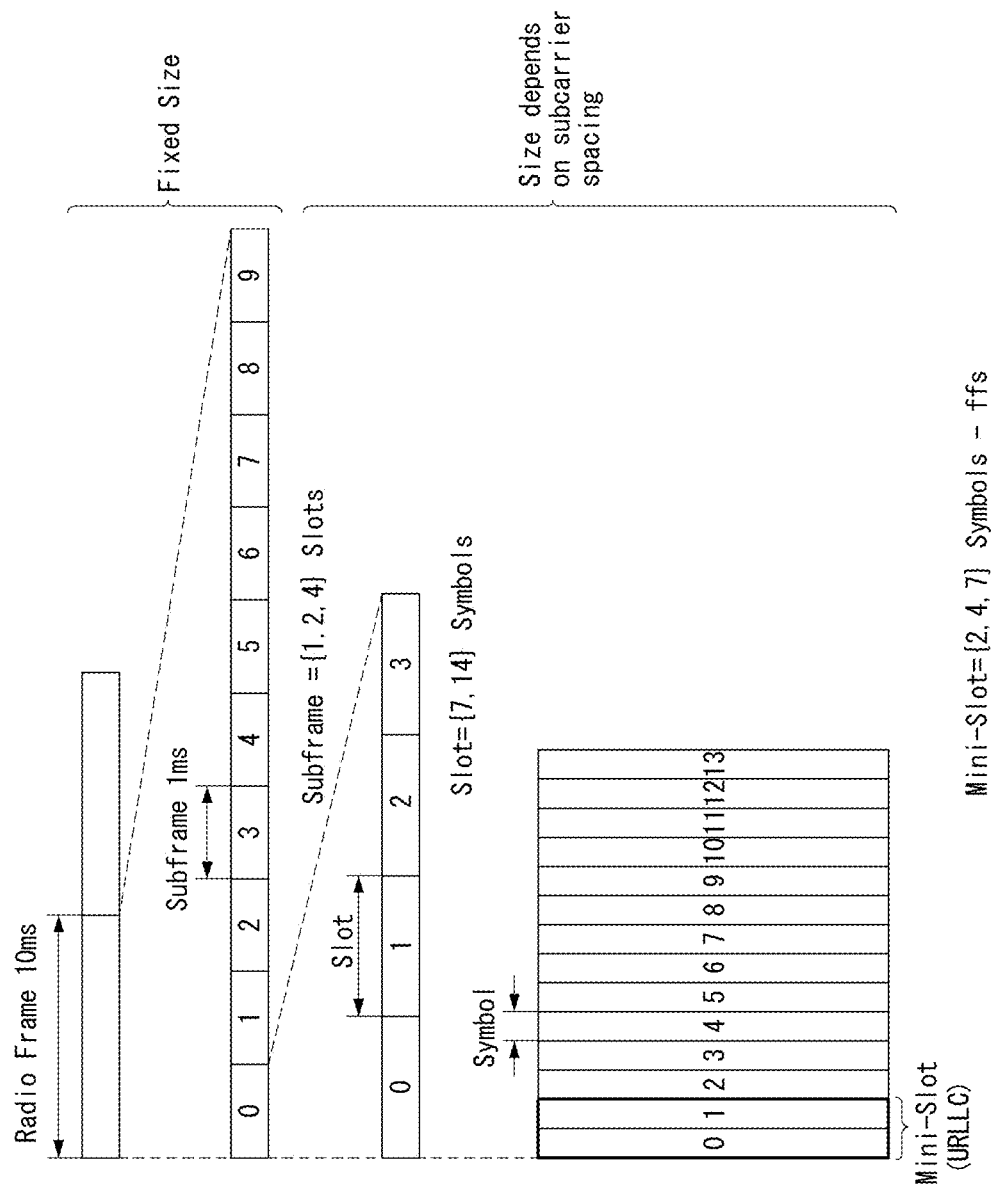
FIG. 3 illustrates an example of a frame structure in an NR system.

FIG. 3 illustrates an example of a frame structure in a NR system. FIG. 3 is merely for convenience of explanation and does not limit the scope of the present disclosure.

In Table 4, in case of µ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 4:
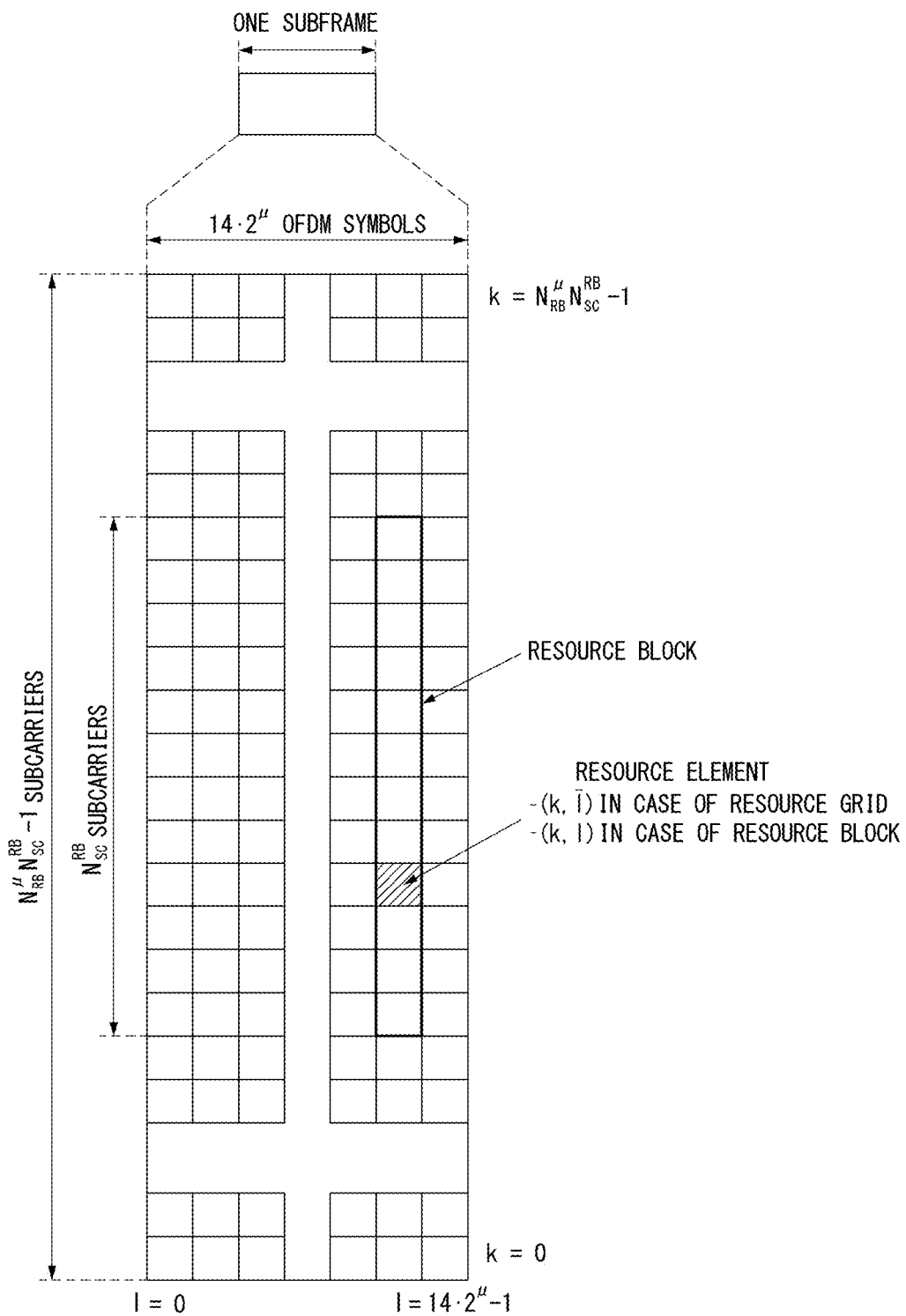
FIG. 4 illustrates an example of a resource grid supported by a wireless communication system to which a method proposed in the present disclosure may be applied.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2p OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

Figure 5:
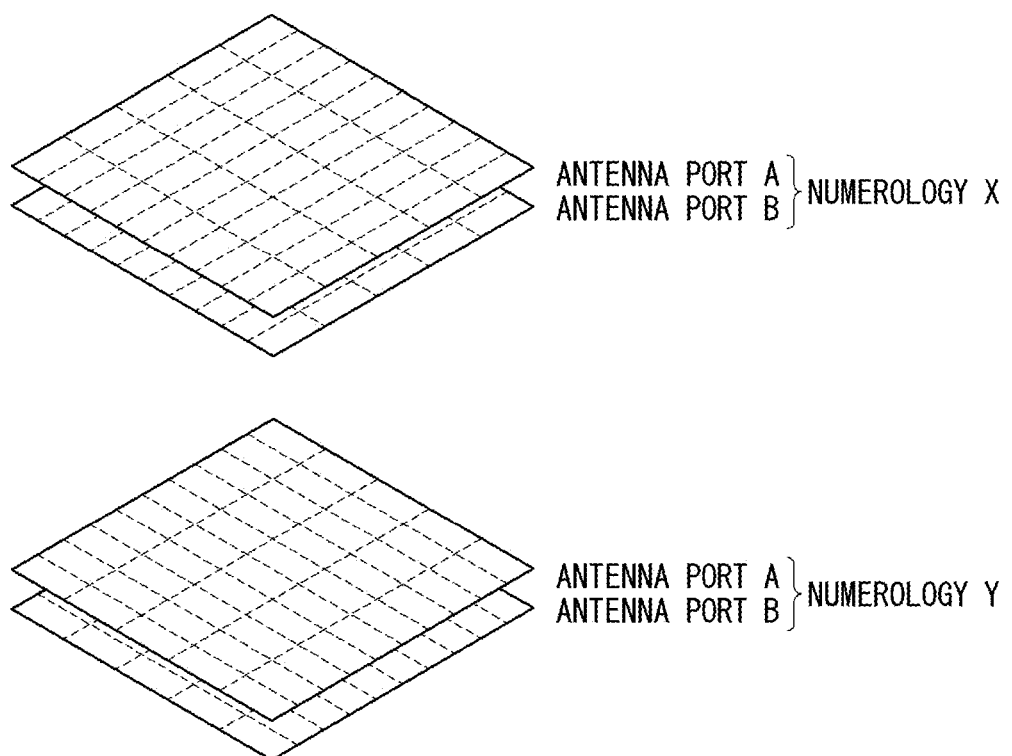
FIG. 5 illustrates examples of a resource grid for each antenna port and numerology to which a method proposed in the present disclosure may be applied.

In this case, as illustrated in FIG. 5, one resource grid may be configured per numerology µ and antenna port p.

FIG. 5 illustrates examples of a resource grid per antenna port and numerology to which a method proposed in the present disclosure is applicable.

Each element of the resource grid for the numerology µ and the antenna port p is called a resource element and is uniquely identified by an index pair (k,l), where k=0, ..., $N_{RB}^\mu N_{sc}^{RB}-1$ is an index on a frequency domain, and l=0, ... $2^\mu N_{symb}^{(\mu)}-1$ refers to a location of a symbol in a subframe. The index pair (k,l) is used to refer to a resource element in a slot, where l=0, ..., $N_{symb}^\mu-1$.

The resource element (k,l) for the numerology µ and the antenna port p corresponds to a complex value $a_{k,l}^{(p,\mu)}$. When there is no risk for confusion or when a specific antenna port or numerology is not specified, the indices p and u may be dropped, and as a result, the complex value may be $a_{k,l}^{(p)}$ or $a_{k,l}$.

Further, a physical resource block is defined as $N_{sc}^{RB}=1$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration P coincides with "point A". A common resource block number $n_{CRB}^{\mu}$ in the frequency domain and resource elements (k, 1) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, V2X, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may consist of consecutive resource blocks (RBs) on the frequency axis and may correspond to one numerology (e.g., sub-carrier spacing, CP length, slot/mini-slot duration).

A base station may configure multiple BWPs even within one CC configured to the UE. As one example, a BWP occupying a relatively small frequency domain may be configured in a PDCCH monitoring slot, and a PDSCH indicated in PDCCH may be scheduled onto a BWP larger than this. Alternatively, when UEs are concentrated on a specific BWP, some UEs may be configured with other BWPs for load balancing. Alternatively, considering frequency domain inter-cell interference cancellation between neighboring cells, a partial spectrum of the entire bandwidth may be excluded and both BWPs may be configured even in the same slot. That is, the base station may configure at least one DL/UL BWP to the UE associated with the wideband CC and may activate at least one DL/UL BWP (by L1 signaling or MAC CE or RRC signaling) among configured DL/UL BWP(s) at a specific time, and switching may be indicated to another configured DL/UL BWP (by L1 signaling or MAC CE or RRC signaling) or a timer value may be switched to the fixed DL/UL BWP when a timer value is expired based on a timer. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

For example, if a specific field (e.g., BWP indicator field) indicating the BWP is included in DCI (e.g., DCI format 1_1) for scheduling of the PDSCH, a value of the corresponding field may be configured to indicate a specific DL BWP (e.g., active DL BWP) among a DL BWP set (pre-)configured for DL reception to the UE. In this case, the UE receiving the DCI may be configured to receive DL data in the specific DL BWP indicated by the corresponding field. And/or, if a specific field (e.g., BWP indicator field) indicating the BWP is included in DCI (e.g., DCI format 11) for scheduling of the PUSCH, a value of the corresponding field may be configured to indicate a specific UL BWP (e.g., active UL BWP) among a UL BWP set (pre-)configured for UL transmission to the UE. In this case, the UE receiving the DCI may be configure to transmit UL data in the specific UL BWP indicated by the corresponding field.

Physical Channel and General Signal Transmission

Figure 6:
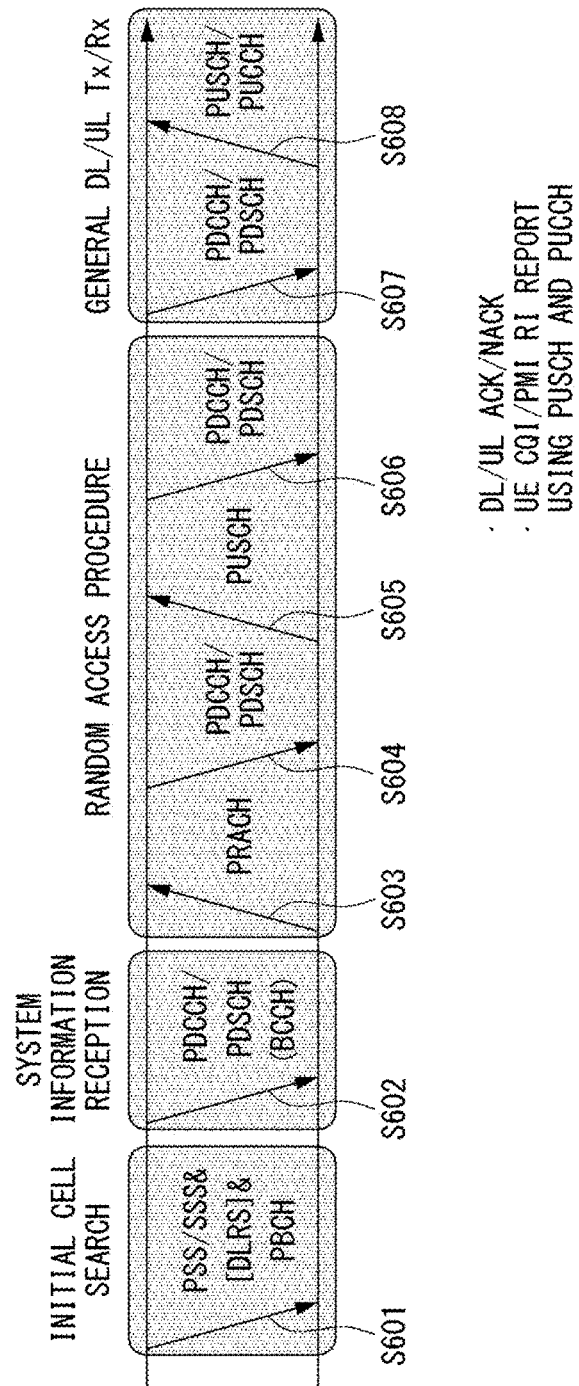
FIG. 6 illustrates physical channels and general signal transmission in used 3GPP system.

FIG. 6 illustrates physical channels and general signal transmission in used 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a random access procedure (RACH) to the eNB (S603 to S606). To this end, the UE may transmit a specific sequence to a preamble through a physical random access channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in an NR system, DCI format 0_0 and DCI format 0_1 are used for scheduling of PUSCH in one cell, and DCI format 1_0 and DCI format 1_1 are used for scheduling PDSCH in one cell. Information included in DCI format 0_0 is CRC scrambled by C-RNTI or CS-RNTI or MCS-C-RNTI and transmitted. And, DCI format 0_1 is used for reserving PUSCH in one cell. Information included in DCI format 0_1 may be CRC scrambled by C-RNTI or CS-RNTI or SP-CSI-RNTI or MCS-C-RNTI and transmitted. DCI format 1_0 is used for scheduling PDSCH in one DL cell. Information included in DCI format 1_0 is CRC scrambled by C-RNTI or CS-RNTI or MCS-C-RNTI and transmitted. DCI format 1_1 is used for scheduling PDSCH in one cell. Information included in DCI format 1_1 is CRC scrambled by C-RNTI or CS-RNTI or MCS-C-RNTI and transmitted. DCI format 2_1 is used to inform PRB(s) and OFDM symbol(s) that the UE may assume that transmission is not intended. The following information included in DCI format 2_1 such as preemption indication 1, preemption indication 2, . . . , preemption indication N is CRC scrambled by INT-RNTI and transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

DL and UL Transmission/Reception Operation

Downlink Transmission/Reception Operation

Figure 7:
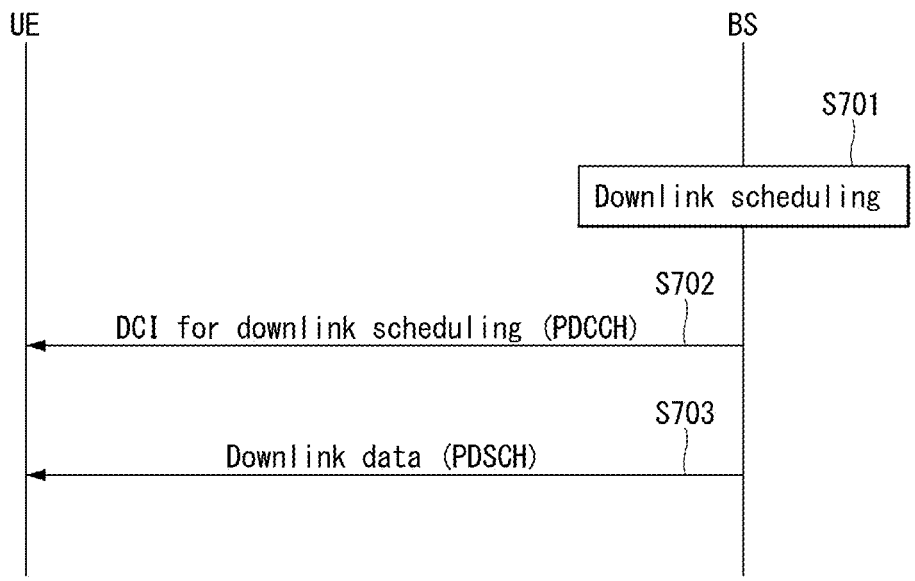
FIG. 7 illustrates an example of a downlink transmission/reception operation.

FIG. 7 illustrates an example of a downlink transmission and reception operation.

Referring to FIG. 7, the eNB may schedule downlink transmission such as the frequency/time resource, the transport layer, a downlink precoder, the MCS, etc., (S701). Specifically, the eNB may determine a beam for PDSCH transmission to the UE. In addition, the UE may receive Downlink Control Information (DCI) for downlink scheduling (i.e., including scheduling information of the PDSCH) on the PDCCH (S702). DCI format 1_0 or DCI format 11 may be used for the downlink scheduling and specifically, DCI format 11 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization.

In particular, according to each state/index indicated in an antenna port(s) field, the number of DMRS ports may be scheduled, and single-user (SU)/multi-user (MU) transmission scheduling is also available. Specifically, the order of DMRS ports corresponding to the number of CWs may be predefined depending on dmrs-type and maxLength, and the number and/or order of DMRS ports may be indicated via an antenna port field of DCI. Further, it may be determined whether the determined DMRS ports are included in the same CDM group or different CDM groups based on DMRS related parameters defined for each DM-RS configuration type.

For example, for DMRS configuration type 1, antenna port p {1000, 1001, 1004, 1005} may be included in CDM group 0, and antenna port p {1002, 1003, 1006, 1007} may be included in CDM group 1. For DMRS configuration type 2, antenna port p {1000, 1001, 1006, 1007} may be included in CDM group 0, antenna port p {1002, 1003, 1008, 1009} may be included in CDM group 1, and antenna port p {1004, 1005, 1010, 1011} may be included in CDM group 2.

For example, for dmrs-Type=2, maxLength=1, and 1 CW, if '2' is indicated through an antenna port field of DMRS, it can be seen that the DMRS port is indicated as 0, 1 (i.e., 1000, 1001), and the DMRS ports are indicated within the same CDM group. For example, if '9' is indicated through the antenna port field of DMRS, it can be seen that the DMRS port is indicated as 0, 1, 2 (i.e., 1000, 1001, 1002), and DMRS ports within different CDM groups are indicated.

In addition, the TCI field consists of 3 bits, and the QCL for the DMRS may be dynamically indicated by indicating a maximum of 8 TCI states according to the TCI field value. The UE may receive downlink data from the base station on the PDSCH (S703). When the UE detects a PDCCH including DCI format 1_0 or 1_1, the UE may decode the PDSCH according to an indication by the corresponding DCI.

Here, when the UE receives a PDSCH scheduled by DCI format 11, a DMRS configuration type may be configured by higher layer parameter "dmrs-Type" in the UE and the DMRS configuration type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

Two types including type 0 and type 1 are supported for resource allocation of the frequency domain for PDSCH.

In the Type 0, resource block assignment information may include a bitmap indicating a resource block group (RBG) assigned to the UE. Here, the RBG may be a set of consecutive virtual resource blocks, and may be defined by higher layer parameter rbg-Size configured by PDSCH-Config and the size of the BWP. The RBGs may be indexed in increasing order of frequencies starting from a lowest frequency of the BWP. The RBG corresponding to value of 1 in the bitmap is allocated to the UE, and the RBG corresponding to value of 0 in the bitmap is not allocated to the UE.

In the Type 1, resource block assignment information indicates, to a scheduled UE, a set of contiguously assigned non-interleaved or interleaved virtual resource blocks within an active BWP (except the case of decoding DCI format 1_0 in CSS using the size of CORESET 0 or using the size of initial DL BWP). A downlink type 1 resource assignment field may consist of a resource indication value RIV corresponding to a starting virtual resource block RB_start and a length of contiguously assigned resource blocks L_RBs.

Physical resource blocks (PRBs) may be bundled, and precoding granularity P' when the UE receives the PDSCH may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

A transport block may be made up of one or more code block groups (CBG), and one CBG may be made up of one or more code blocks (CB). Also, in an NR system, data transmission and reception may be performed for each CB/CBG as well as for each transport block. Accordingly, ACK/NACK transmission and retransmission per CB/CBG also may be possible. The UE may receive information on CB/CBG from the base station through a DCI (e.g., DCI format 0_1 and DCI format 1_1). Also, the UE may receive information on a data transmission unit (e.g., TB/CB/CBG) from the base station.

UL Transmission/Reception Operation

Figure 8:
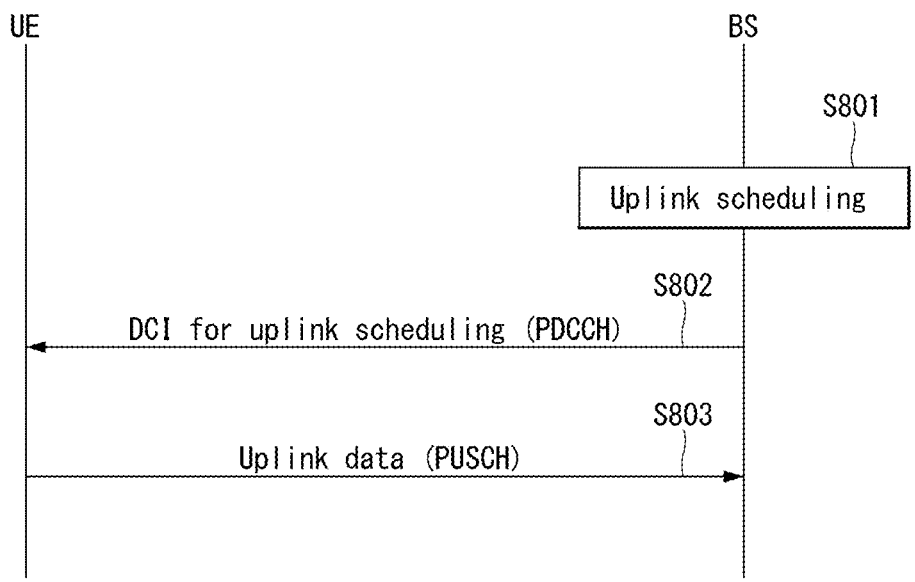
FIG. 8 illustrates an example of an uplink transmission/reception operation.

FIG. 8 illustrates an example of an uplink transmission and reception operation. Referring to the FIG. 8, the eNB may schedule uplink transmission such as the frequency/time resource, the transport layer, an uplink precoder, the MCS, etc., (S801). In particular, the eNB may determine a beam for PUSCH transmission of the UE through the beam management operations described above. And, the UE may receive, from the eNB, DCI for uplink scheduling (i.e., including scheduling information of the PUSCH) on the PDCCH (S802).

DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE may transmit the uplink data to the eNB on the PUSCH (S803). When the UE detects a PDCCH including DCI format 0_0 or 0_1, the UE may transmit the corresponding PUSCH according to the indication by the corresponding DCI. two schemes (Codebook based transmission scheme and non-codebook based transmission scheme) are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 00, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Demodulation Reference Signal (DMRS)

A DMRS-related operation for PDSCH reception will be described.

When receiving PDSCH scheduled by DCI format 1_0 or receiving PDSCH before dedicated higher layer configuration of any of the parameters dmrs-AdditionalPosition, maxLength, and dmrs-Type, the UE assumes that the PDSCH is not present in any symbol carrying DM-RS except for PDSCH with allocation duration of 2 symbols with PDSCH mapping type B, and a single symbol front-loaded DM-RS of configuration type 1 on DM-RS port 1000 is transmitted, and that all the remaining orthogonal antenna ports are not associated with transmission of PDSCH to another UE.

In addition, for PDSCH with mapping type A, the UE assumes that dmrs-AdditionalPosition='pos2' and up to two additional single-symbol DM-RS are present in a slot according to the PDSCH duration indicated in the DCI. For PDSCH with allocation duration of 7 symbols for normal CP or 6 symbols for extended CP with mapping type B, the UE assumes that one additional single-symbol DM-RS is present in the 5th or 6th symbol when the front-loaded DM-RS symbol is in the 1st or 2nd symbol respectively of the PDSCH allocation duration. Otherwise, the UE assumes that the additional DM-RS symbol is not present. And, for PDSCH with allocation duration of 4 symbols with mapping type B, the UE assumes that no additional DM-RS are present. For PDSCH with allocation duration of 2 symbols with mapping type B, the UE assumes that no additional DM-RS are present, and the UE assumes that the PDSCH is present in the symbol carrying DM-RS.

Figure 9:
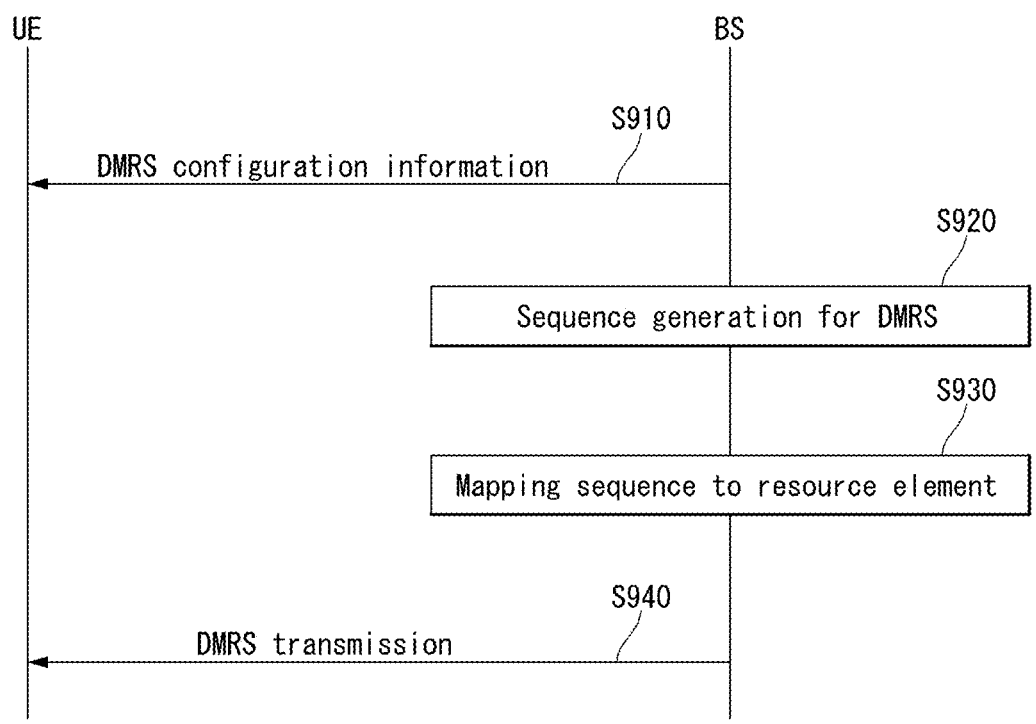
FIG. 9 is a flow chart illustrating an example of a DL DMRS procedure.

FIG. 9 is a flow chart illustrating an example of a DL DMRS procedure.

A base station transmits DMRS configuration information to a UE, in S910.

The DMRS configuration information may refer to DMRS-DownlinkConfig IE. The DMRS-DownlinkConfig IE may include parameter dmrs-Type, parameter dmrs-AdditionalPosition, parameter maxLength, parameter phaseTrackingRS, etc.

The parameter dmrs-Type is a parameter for selection of a DMRS configuration type to be used for DL. In NR, the DMRS may be classified into two configuration types: (1) DMRS configuration type 1 and (2) DMRS configuration type 2. The DMRS configuration type 1 is a type having a higher RS density in the frequency domain, and the DMRS configuration type 2 is a type having more DMRS antenna ports.

The parameter dmrs-AdditionalPosition is a parameter indicating the position of an additional DMRS in the DL. If the corresponding parameter is not present, the UE applies value of pos2. In the DMRS, a first position of a front-loaded DMRS may be determined according to the PDSCH mapping type (type A or type B), and an additional DMRS may be configured to support a high speed UE. The front-loaded DMRS occupies 1 or 2 consecutive OFDM symbols and is indicated by RRC signaling and downlink control information (DCI).

The parameter maxLength is a parameter indicating the maximum number of OFDM symbols for DL front-loaded DMRS. The parameter phaseTrackingRS is a parameter for configuring DL PTRS. If the corresponding parameter is not present or has been canceled, the UE assumes that there is no DL PTRS.

The base station generates a sequence used for DMRS, in S920.

The sequence for DMRS is generated according to Equation 3 below.

$$r(n) = \frac{1}{\sqrt{2}}(1 - 2 \cdot c(2n)) + j\frac{1}{\sqrt{2}}(1 - 2 \cdot c(2n+1)) \quad \text{[Equation 3]}$$

The pseudo-random sequence c(i) is defined by 3GPP TS 38.211 5.2.1. That is, c(i) may be a length-31 gold sequence using two m-sequences. A pseudo-random sequence generator is initialized by Equation 4 below.

$$c_{init}=(2^{17}(N_{symb}^{slot}n_{s,f}^{\mu}+l+1)(2N_{ID}^{nSCID}+1)+2N_{ID}^{nSCID}+n_{SCID})\bmod 2^{31}$$

[Equation 4]

where l is the OFDM symbol number within the slot, and $n_{s,f}^{\mu}$ is the slot number within a frame.

$N_{ID}^{0}, N_{ID}^{1} \in \{0,1, \ldots, 65535\}$ are given by the higher-layer parameter scramblingID0 and scramblingID1, respectively, in the DMRS-DownlinkConfig IE if provided and the PDSCH is scheduled by PDCCH using DCI format 1_1 with the CRC scrambled by C-RNTI, MCS-C-RNTI, or CS-RNTI.

$N_{ID}^{0} \in \{0,1, \ldots, 65535\}$ is given by the higher-layer parameter scramblingID0 in the DMRS-DownlinkConfig IE if provided and the PDSCH is scheduled by PDCCH using DCI format 1_0 with the CRC scrambled by C-RNTI, MCS-C-RNTI, or CS-RNTI.

$N_{ID}^{nSCID}=N_{ID}^{cell}$, otherwise, the quantity $n_{SCID} \in \{0, 1\}$ is given by the DMRS sequence initialization field in the DCI associated with the PDSCH transmission if DCI format 1_1 is used.

The base station maps the generated sequence to a resource element, in S930. Here, the resource element may mean including at least one of time, frequency, antenna port, or code.

The base station transmits the DMRS to the UE on the resource element, in S940. The UE receives the PDSCH using the received DMRS.

Quasi-Co Location (OCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the code point of the DCI field 'Transmission Configuration Indication'.

In relation to the beam indication, the UE may be RRC-configured with a list for up to M candidate Transmission Configuration Indication (TCI) states for the purpose of at least Quasi Co-location (QCL) indication, where M may be 64.

Each TCI state may be configured in one RS set. IDs of each DL RS for the purpose of spatial QCL (QCL Type D) at least in the RS set may refer to one of DL RS types such as SSB, P-CSI RS, SP-CSI RS, and A-CSI RS. Initialization/update for the ID of DL RS(s) in the RS set that are used at least for the purpose of spatial QCL may be performed at least by explicit signaling.

The TCI-State IE associates one or two DL reference signals (RS) with a corresponding quasi co-location (QCL) type. The TCI-State IE may include parameters such as bwp-Id/reference signal/QCL type.

A bwp-Id parameter indicates DL BWP where RS is positioned, a cell parameter indicates a carrier where RS is positioned, a reference signal parameter indicates a reference antenna port(s) that is a source of quasi co-location for a corresponding target antenna port(s), or a reference signal including it. The target antenna port(s) may be CSI-RS, PDCCH DMRS, or PDSCH DMRS. For example, a corresponding TCI state ID may be indicated to NZP CSI-RS resource configuration information to indicate QCL reference RS information for NZP CSI-RS. As another example, a TCI state ID may be indicated in each CORESET configuration to indicate QCL reference information for the PDCCH DMRS antenna port(s). As another example, a TCI state ID may be indicated through DCI to indicate QCL reference information for the PDSCH DMRS antenna port(s).

The descriptions (e.g., 3GPP system, frame structure, DL transmission and reception operation, etc.) given above can be combined and applied to methods described in the present disclosure to be described below, or can be supplemented to clarify technical features of the methods described in the present disclosure. In the present disclosure, the presence of a slash '/' may mean that all and/or some of the contents separated by '/' are included.

Multi-Transmission/Reception Point (TRP)-Related Operation

The coordinated multi point (CoMP) technique is a scheme in a plurality of base stations exchange (e.g., use X2 interface) or utilize channel information (e.g., RI/CQI/PMI/LI, etc.) fed back from the user equipment (UE) to perform cooperative transmission with the UE, thereby effectively controlling interference. According to the scheme used, the cooperative transmission may be divided into joint transmission (JT), coordinated scheduling (CS), coordinated beamforming (CB), dynamic point selection (DPS), dynamic point blacking (DPB), and the like.

Non-coherent joint transmission (NCJT) may refer to cooperative transmission that does not consider interference (that is, with no interference). For example, the NCJT may be a scheme in which a base station(s) transmits data to one UE through multiple TRPs by using the same time resource and frequency resource. In this scheme, the multiple TRPs of the base station(s) may be configured to transmit data to UE through different layers by using different demodulation reference signal (DMRS) ports. In other words, the NCJT may correspond to a transmission scheme in which transmission of a MIMO layer(s) from two or more TRPs is performed without adaptive precoding between the TRPs.

The NCJT is divided into a fully overlapped NCJT in which the time frequency resources transmitted by each TRP are fully overlapped, and a partially overlapped NCJT in which only sometime frequency resources are overlapped. For example, in the case of partially overlapped NCJT, both data of a first base station (e.g., TRP 1) and data of a second base station (e.g., TRP 2) may be transmitted in some of the time resources and/or frequency resources, and data of only one of the first and second base stations may be transmitted in the remaining time resources and/or frequency resources.

TRP transmits data scheduling information to an NCJT receiving UE as DCI (Downlink Control Information). From the perspective of downlink control information (DCI) transmission, M-TRP (multiple TRP) transmission may be divided into i) M-DCI (multiple DCI) based M-TRP transmission in which each TRP transmits a different DCI and ii) S-DCI (single DCI) based M-TRP transmission in which one TRP transmits DCI.

Firstly, the single DCI based MTRP scheme will be described. In the single DCI based MTRP scheme in which a representative TRP transmits scheduling information for data transmitted by itself and data transmitted by another TRP through one DCI, MTRPs cooperatively transmit one common PDSCH and each TRP participating in the cooperative transmission spatially divides the corresponding PDSCH into different layers (i.e., different DMRS ports). In other words, MTRPs transmit one PDSCH but each TRP transmits only some of multiple layers of the PDSCH. For example, when 4-layer data is transmitted, TRP 1 transmits 2 layers, and TRP 2 transmits the remaining 2 layers to the UE.

In this case, scheduling information for the PDSCH is indicated to the UE through one DCI, and the corresponding DCI indicates which DMRS port uses information of which QCL RS and QCL type (which is different from conventionally indicating the QCL RS and TYPE that are commonly applied to all DMRS ports indicated by the DCI). That is, M TCI states (M=2 for 2 TRP cooperative transmission) are indicated through the TCI field in the DCI, and the QCL RS and type are identified by using M TCI states which are different for M DMRS port groups. Also, DMRS port information may be indicated by using a new DMRS table.

As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

Secondly, the multiple DCI based MTRP method will be described. MTRPs transmit different DCIs and PDSCHs, respectively (the UE receives N DCIs and N PDSCHs from N TRPs), and the corresponding PDSCHs are transmitted by (partially or wholly) overlapping on different time resources. The corresponding PDSCHs are transmitted through different scrambling IDs, and the corresponding DCIs may be transmitted through Coresets belonging to different Coreset groups (A coreset group may be identified as an index defined in the coreset configuration of each Coreset. For example, if Coresets 1 and 2 are set to index=0 and Coresets 3 and 4 are set to index=1, Coresets 1 and 2 belong to Coreset group 0 and Coresets 3 and 4 belong to Coreset group 1. If no index is defined for a coreset, this may be interpreted as index=0). If multiple scrambling IDs are set in one serving cell or two or more coreset groups are set, the UE may know that data is received by multiple DCI-based MTRP operation.

For example, the single DCI based MTRP scheme or the multiple DCI based MTRP scheme may be indicated to the UE via separate signaling. As an example, when a plurality of CRS patterns are indicated to the UE for MTRP operation for one serving cell, PDSCH rate matching for CRS may be different depending on this MTRP operation is a single DCI based MTRP operation or a multiple DCI based MTRP operation.

The base station described in this disclosure may be a generic term for an object that transmits/receives data to and from UE. For example, the base station described herein may be a concept including one or more transmission points (TPs), one or more transmission and reception points (TRPs), and the like. For example, multiple TPs and/or multiple TRPs described herein may be included in one base station or included in multiple base stations. In addition, the TP and/or TRP may include a panel of a base station, a transmission and reception unit, and the like.

In addition, the TRP described in this disclosure means an antenna array having one or more antenna elements available in a network located at a specific geographical location in a specific area. Although this disclosure is described with respect to "TRP" for convenience of explanation, the TRP may be replaced with a base station, a transmission point (TP), a cell (e.g., a macro cell/small cell/pico cell, etc.), an antenna array, or a panel and understood and applied as such.

In addition, the CORESET group ID described in this disclosure may refer to an index/identification information (e.g., ID)/indicator, etc. for distinguishing a CORESET configured for/associated with each TRP/panel (or for each TRP/panel). In addition, the CORESET group may be a group/union of CORESETs which is distinguished by the index/identification information (e.g., ID) for distinguishing the CORESET and the CORESET group ID. For example, the CORESET group ID may be specific index information defined in the CORESET configuration. For example, the CORESET group may be configured/indicated/defined by an index defined in the CORESET configuration for each CORESET. The CORESET group ID may be configured/indicated via higher layer signaling (e.g., RRC signaling)/L2 signaling (e.g., MAC-CE)/L1 signaling (e.g., DCI).

For example, ControlResourceSet information element (IE) that is a higher layer parameter is used to configure a time/frequency control resource set (CORESET). For example, the control resource set may be related to detection and reception of downlink control information. Examples of the ControlResourceSet IE may include CORESET related ID (e.g., controlResourceSetID), an index of a CORESET pool for CORESET (e.g., CORESETPoolIndex), time/frequency resource configuration of CORESET, and TCI information related to CORESET. For example, the index of the CORESET pool (e.g., CORESETPoolIndex) may be set to 0 or 1. The index of the CORESET pool may mean a CORESET group ID. For example, the index of the CORESET pool (e.g., CORESETPoolIndex) may correspond to the above-described CORESET group ID.

M-TRP (Multiple-TRP) Transmission Scheme

M-TRP transmission by which multiple (e.g., M) TRPs transmit data to one user equipment (UE) may be divided into two main types of transmission: eMBB M-TRP transmission (or M-TRP eMMB) which is a scheme for increasing a transmission rate and URLLC M-TRP transmission (or M-TRP URLLC) which is a scheme for increasing a reception success rate and reducing latency.

URLLC M-TRP may mean that M-TRPs transmit the same TB (Transport Block) using different resources (e.g., layers/time resources/frequency resources, etc.). A number of TCI state(s) may be indicated by DCI to a UE configured with the URLLC M-TRP transmission scheme, and data received using the QCL reference signal (RS) of each TCI state may be assumed to be the same TB. On the other hand, eMBB M-TRP may mean that M-TRPs transmit different TBs using different resources (e.g., layers/time resources/frequency resources, etc.). A number of TCI state(s) may be indicated by DCI to a UE configured with the eMBB M-TRP transmission scheme, and data received using the QCL RS of each TCI state may be assumed to be different TBs. In relation to at least eMBB M-TRP, each TCI code point within DCI may correspond to 1 or 2 TCI states. If 2 TCI states are activated within one TCI code point, each TCI state for at least DMRS type 1 may correspond to one CDM group.

For example, the UE may decide/determine whether the corresponding M-TRP transmission is URLLC transmission or eMBB transmission since it uses the RNTI configured for MTRP-URLLC and the RNTI configured for MTRP-eMBB, separately. That is, if the CRC masking of the DCI received by the UE is performed using the RNTI configured for the MTRP-URLLC purpose, this may correspond to URLLC transmission, and if the CRC masking of the DCI is performed using the RNTI configured for the MTRP-eMBB purpose, this may correspond to eMBB transmission.

The URLLC M-TRP transmission scheme may include an SDM based scheme, a TDM based scheme, a FDM based scheme, etc to be described later. The UE may also be configured with detailed schemes (e.g., SDM/FDM/TDM) of the URLLC M-TRP transmission scheme. For example, a higher layer parameter (e.g., repetitionScheme) for this may be defined, and one of the SDM, FDM or TDM schemes may be configured through the corresponding parameter. The UE may recognize that the same RB is transmitted using other layer/time/frequency from M-TRP based on the configured scheme.

Method of Improving Reliability in Multi-TRPs

Figure 10A:
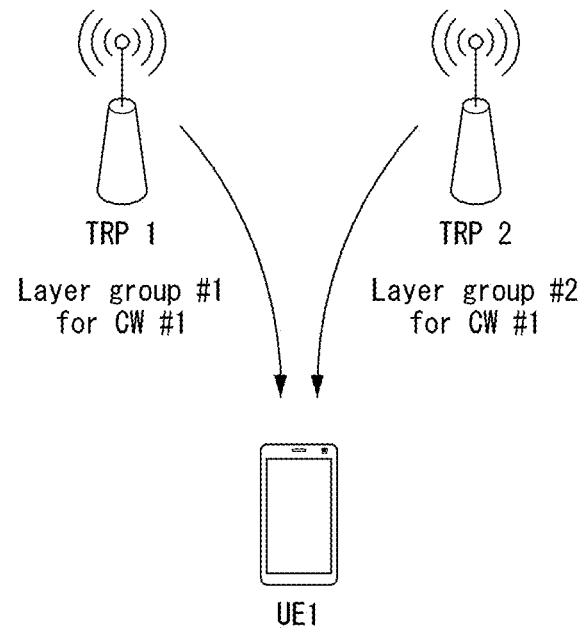
FIGS. 10A and 10B illustrate an example of a transmission/reception method of improving reliability using transmission in multiple TRPs.
Figure 10B:
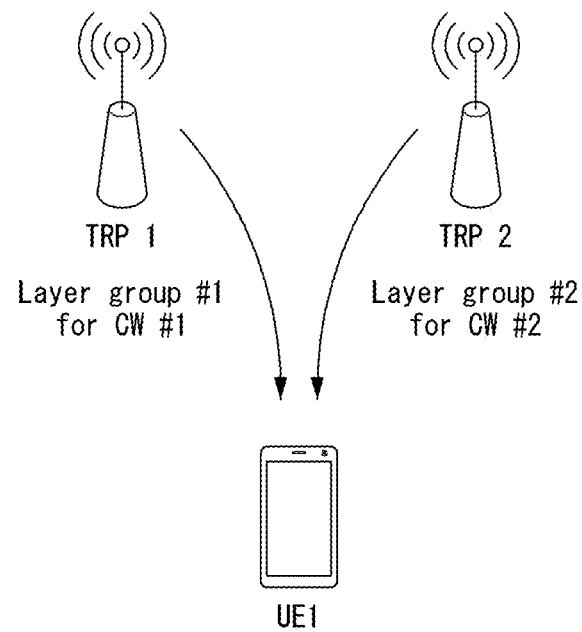

FIGS. 10A and 10B illustrate an example of a transmission/reception method of improving reliability supported by a plurality of TRPs, and the following two methods may be considered.

The example in FIG. 10A shows that a layer group transmitting the same codeword (CW)/transport block (TB) correspond to different TRPs. That is, the same CW may be transmitted via different layers/layer groups. In this case, a layer group may refer to some kind of layer set made up of one or more layers. As such, the amount of transmission resources increases as the number of layers increases, and this is advantageous in that robust channel coding with a low code rate can be used for TB. In addition, it is expected that the reliability of received signals may be improved based on diversity gain due to different channels from a plurality of TRPs.

The example in FIG. 10B shows an example in which different CWs are transmitted via layer groups corresponding to different TRPs. That is, different CWs may be transmitted through different layers/layer groups. In this case, it may be assumed that TBs corresponding to the first CW (CW #1) and the second CW (CW #2) are the same. Therefore, this can be seen as an example of repeated transmission of the same TB. In the case of FIG. 10B, the code rate corresponding to the TB may be higher than that of (a) of FIG. 9. Still, there is an advantage that a code rate can be adjusted by indicating different redundancy version (RV) values for encoding bits generated from the same TB according to a channel environment, or that a modulation order of each CW may be adjusted.

In FIG. 10A or FIG. 10B, the same TB is repeatedly transmitted via different layer groups, and each layer group is transmitted by different TRPs/panels, thereby increasing the data reception probability, which may be called spatial division multiplexing (SDM)-based URLLC M-TRP transmission. A layer(s) belonging to different layer groups are transmitted through DMRS ports belonging to different DMRS CDM groups, respectively.

In addition, although the above description regarding multiple TRPs has been given with respect to a spatial division multiplexing (SDM) scheme using different layers, it also may be extensively applied to a frequency division multiplexing (FDM) scheme based on different frequency domain resources (e.g., RB/PRB (set)), and/or a time division multiplexing (TDM) scheme based on different time domain resources (e.g., slots, symbols, and sub-symbols).

For example, a TDM based URLLC M-TRP operation may include i) a scheme in which one TRP transmits a TB in one slot (e.g., scheme 4) and ii) a scheme in which one TRP transmits a TB via several consecutive OFDM symbols (i.e., a symbol group) (e.g., scheme 3). The scheme i) has an effect of increasing the probability of data reception through the same TB received from several TRPs in several slots. The scheme ii) has an effect in which several TRPs can transmit the same TB via different symbol groups within one slot.

For example, if the above description is extended and applied to a frequency division multiplexing (FDM) scheme based on different frequency domain resources (e.g., RB/PRB (set)), the following operation may be performed. This operation may be an operation of a case in which the FDM scheme is configured via a higher layer parameter (e.g., repetitionScheme). The different frequency domain resources may correspond to different TRPs. Further, the different frequency domain resources may mean that resource regions corresponding to the respective TRPs do not overlap in a frequency domain.

For example, the same CW/TB may be transmitted via the different frequency domain resources (e.g., RB/PRB (set)). Alternatively, for example, a plurality of CWs (e.g., CW #1/CW #2) corresponding to the same TB may be transmitted via the different frequency domain resources (e.g., RB/PRB (set)). This can be seen as an example of repeated transmission of the same TB. The UE configured with a plurality of TCI states via DCI may receive data (e.g., CW/TB) using QCL RS of each TCI state, and it may be assumed that the received data is the same TB.

Figure 11A:
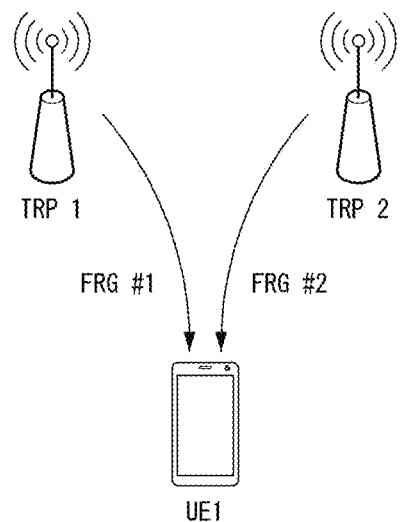
FIGS. 11A and 11B illustrate an example of transmitting data to a UE using different frequency resources at different TRPs.
Figure 11B:
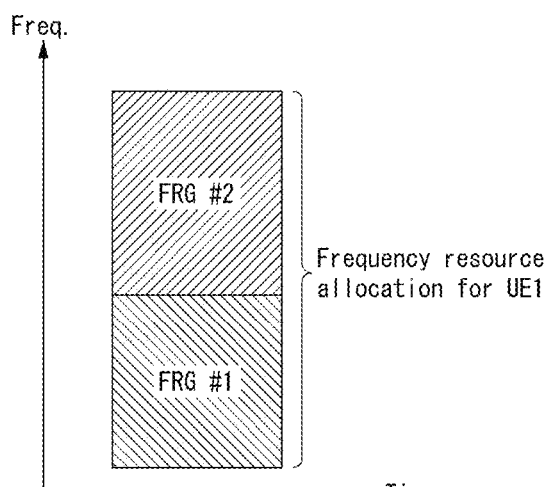

FIGS. 11A and 11B illustrates an example of transmitting data to a UE (e.g., UE1) using different frequency resources at different TRPs (e.g., TRP1 and TRP 2). More specifically, FIG. 11A illustrates an example of a FDM based URLLC M-TRP operation. Referring to FIG. 11A, TRP1 may transmit data via a first frequency resource group (i.e., FRG #1), and TRP2 may transmit data via a second frequency resource group (i.e., FRG #2). Referring to FIG. 11B, the first frequency resource group and the second frequency resource group may overlap in the time domain and may not overlap in the frequency domain. From a UE perspective, the UE may receive data from different TRPs in the first frequency resource group and the second frequency resource group that do not overlap in the frequency domain.

FIG. 11B illustrates a situation where the different frequency resource groups overlap in the time domain, by way of example. However, this is merely an example for convenience of description and does not limit the technical scope of the present disclosure. Thus, a situation where the different frequency resource groups partially overlap or do not overlap in the time domain may also be considered.

That is, multiple TRPs may transmit data in different frequency domain resources through the FDM scheme. In this instance, a frequency resource group (FRG) may mean a set of frequency resources, and one frequency resource group may include one or more frequency resources. For example, the FRG may be used by being replaced by a term such as PRG, PRG set, resource block group (RBG), and RBG set.

As above, in the case of transmitting a signal (or data) to the UE at different TRPs, it can be expected that the reliability of the received signal is improved based on a diversity gain because channels from multiple TRPs are different.

In the above-described FDM based M-TRP operation, a single DCI based M-TRP transmission in which a representative TRP of multiple TRPs transmits DCI may be performed. As a method of allocating different frequency resources to different TRPs using one DCI, the following two schemes may be considered.

Figure 12A:
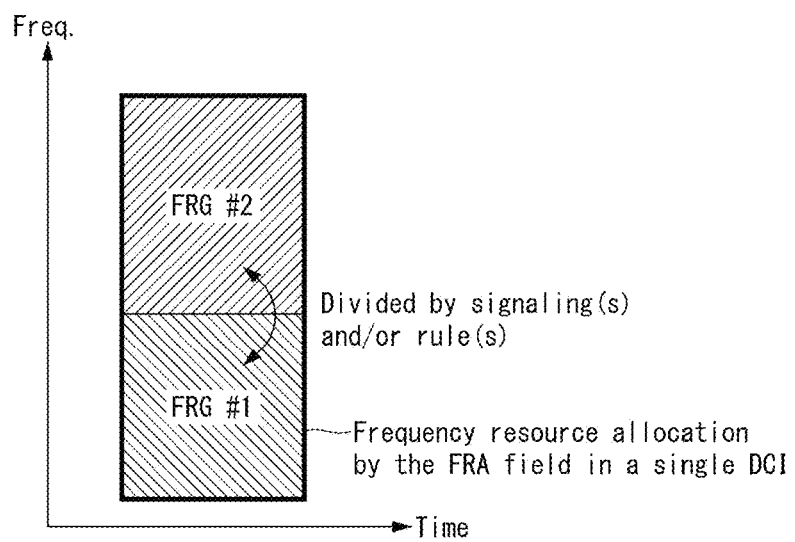
FIGS. 12A and 12B illustrate an example of a method of allocating frequency resources to different TRPs via single DCI in a single DCI based M-TRP operation.
Figure 12B:
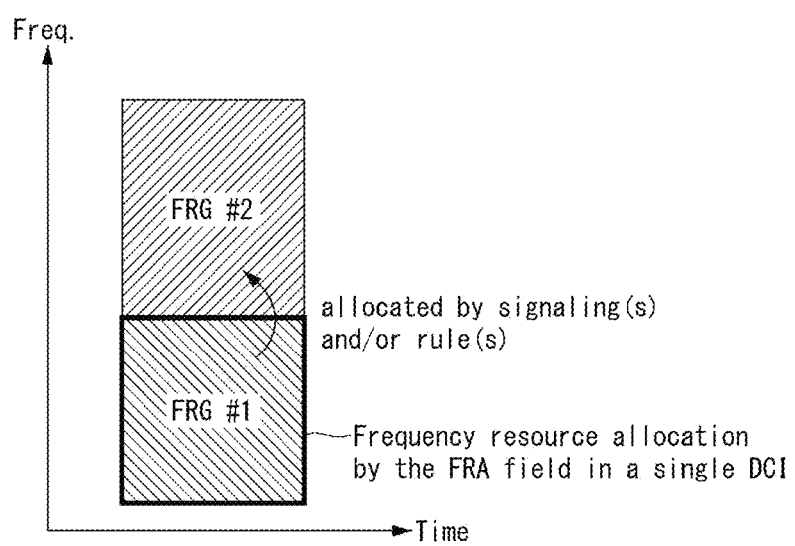

FIGS. 12A and 12B illustrates an example of a method of allocating frequency resources to different TRPs via single DCI in a single DCI based M-TRP operation (e.g., FRA method 1 and FRA method 2).

Referring to FIG. 12A, a frequency resource allocation (FRA) field in DCI indicates scheduling frequency resources for all TRPs, and different TRPs may share the frequency resources scheduled by DCI based on signaling (e.g., higher layer signaling/DCI) and/or rules. The FRA field in DCI may mean a 'frequency domain resource assignment' field of DCI. Hereinafter, such a method is referred to as 'FRA method 1' for convenience of description.

Referring to FIG. 12B, the FRA field in DCI indicates scheduling frequency resources for a specific TRP, and frequency resources mapped to other TRP may be allocated based on signaling (e.g., higher layer signaling/DCI) and/or rules. Hereinafter, such a method is referred to as 'FRA method 2' for convenience of description.

As a method of defining frequency resources which is basic for size calculation of a transport block (TB), (i) a method of considering all frequency resources allocated to multiple TRPs (hereinafter, referred to as 'reference frequency resource (FR) definition method 1') and (ii) a method of considering only frequency resources allocated to a specific TRP (hereinafter, referred to as 'reference FR definition method 2').

Compared with the above reference FR definition method 1, the reference FR definition method 2 may be interpreted as a repeated transmission form of a single TB. In this case, it may have an advantage that a different modulation order/ RV, etc. can be applied to each TB.

Considering a combination of the method of allocating frequency resources to different TRPs via single DCI (e.g., FRA method 1 and FRA method 2) and the reference FR determination method for the TB size calculation (e.g., reference FR definition method 1 and reference FR definition method 2), the part that may affect the current standard is described below.

- Combination of the FRA method 1 and the reference FR definition method 1: signaling and/or rule for dividing frequency resources allocated based on DCI into each TRP are required. The TB size calculation may not be affected.
- Combination of the FRA method 1 and the reference FR definition method 2: signaling and/or rule for dividing frequency resources allocated based on DCI into each TRP are required. Signaling and/or rule for determining reference resources for TB size calculation are also required. A separate MCS/RV indication may be possible for each TB.
- Combination of the FRA method 2 and the reference FR definition method 1: signaling and/or rule for frequency resource determination of other TRP based on frequency resources allocated via DCI are required. Signaling and/or rule for determining reference resources for TB size calculation are also required.
- Combination of the FRA method 2 and the reference FR definition method 2: signaling and/or rule for frequency resource determination of other TRP based on frequency resources allocated via DCI are required. The TB size calculation may not be affected. A separate MCS/RV indication may be possible for each TB.

The present disclosure describes methods that can be proposed when additional UE/base station operation and/or signaling/rule are required depending on the combinations of the FRA method and the reference FR definition method when considering joint transmission (e.g., NCJT) between multiple base stations (e.g., multiple TPs/TRPs of one or more base stations, etc.) and a UE in a wireless communication system, in particular, for the FDM based M-TRP operation.

Specifically, proposal 1 proposes a method of configuring, via DCI, all frequency resources for a plurality of TRPs jointly transmitting in single DCI based M-TRP transmission and distributing and using the configured frequency resources into each TRP. Proposal 1-1 proposes a method of assuming resource allocation based on the proposal 1 and receiving PTRS from M-TRP. Proposal 2 proposes a method of configuring, via DCI, frequency resources for a specific TRP of a plurality of TRPs jointly transmitting in single DCI based M-TRP transmission and determining frequency resources of other TRP based on the configured frequency resources. The proposal 1 and the proposal 2 also propose a reference resource determination method for TB size calculation according to each resource allocation method.

Methods described in the present disclosure are described based on one or more TPs/TRPs of base station(s), but it is obvious that the methods can be equally or similarly applied to transmission based on one or more panels of the base station(s). The proposal 1, the proposal 1-1, and the proposal 2 described in the present disclosure assume a single DCI based M-TRP operation and are described focusing on a situation where two TRPs operate in the NCJT for convenience of description. However, it is obvious that the proposal 1, the proposal 1-2, and the proposal 2 can be applied even if two or more TRPs operate.

[Proposal 1]

As in the above-described FRA method 1, current DCI provides only a single field for frequency resource allocation (e.g., 'Frequency domain resource assignment' field), and frequency resources for all M-TRPs operating in the NCJT through the corresponding field may be configured/indicated. A certain rule and/or signaling method between a base station and a UE shall be defined to determine a frequency resource corresponding to each TRP in the allocated frequency resources. The proposal 1 of the present disclosure proposes a method of grouping resources for all the TRPs allocated via single DCI in units of specific resource (e.g., PRG/PRG set/RBG/RBG set, etc.), and determining a frequency resource for each TRP based on mapping between each group (/subgroup) and a TCI state associated with each TRP.

Specifically, if multiple TCI states are indicated to the UE (i.e., if a specific code point associated with two or more TCI states is configured via DCI), frequency resources for respective TRPs may be distinguished by corresponding TCI states related to different TRPs to frequency resources. In other words, frequency resources corresponding to respective TCI states may be different in a frequency resource domain indicated via single DCI. A method of corresponding a TCI state related to a different TRP to a specific frequency resource in order to support multi-TRP transmission and an allocation method according to this are described below.

Method 1) As an example of a method of allocating a different frequency resource to a different TRP via single DCI, a PRG set consisting of one or more precoding resource block groups (PRG) may be used. In this instance, one PRG set may include one or more PRGs, and the number of PRGs constituting one PRG set may be configured to the UE via higher layer signaling and/or DCI signaling. Alternatively, the number of PRGs may be defied between the base station and the UE by a fixed rule.

If precoding granularity as 2 or 4 is configured/indicated to the UE, a precoding resource block group (PRG) is divided into 2 or 4 consecutive PRBs. In other words, one PRG may consist of 2 or 4 consecutive PRBs. The UE may assume that the same precoding is applied to consecutive downlink PRBs in the PRG.

If the precoding granularity as 2 or 4 is configured/indicated to the UE, a frequency resource corresponding to each TCI state may be allocated to the UE in units of certain PRG set consisting of multiple PRG(s). More characteristically, consecutive PRG sets may have features that alternately correspond to different TCI states.

Figure 13:
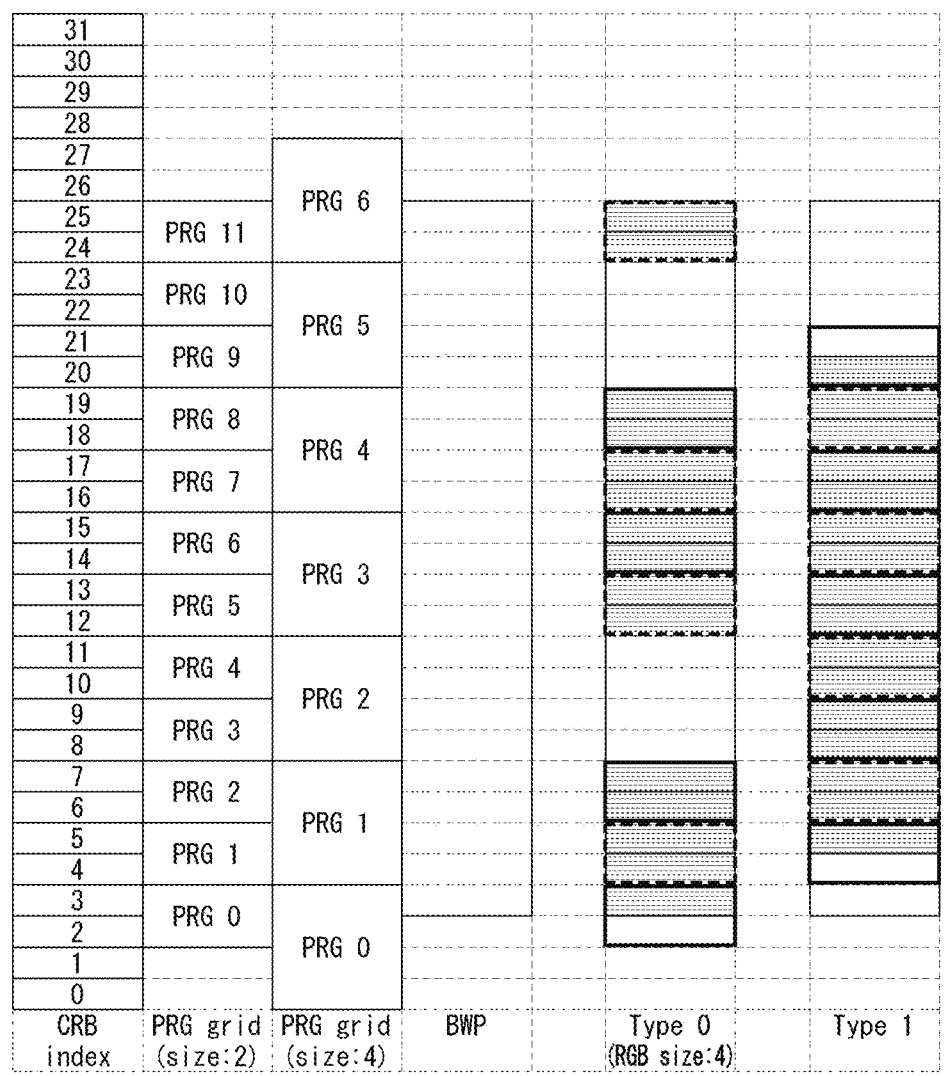
FIG. 13 illustrates an example of allocating a frequency resource to each TRP based on a PRG set.

FIG. 13 illustrates an example of allocating a frequency resource to each TRP based on a PRG set. FIG. 13 is merely an example for convenience of description and does not limit the technical scope of the present disclosure. In FIG. 13, CRB, PRG, and BWP mean a common resource block, a precoding resource block group, a bandwidth part, respectively, and the same term may also be used in the following description.

FIG. 13 illustrates that for each of Type 0 (e.g., RBG size 4) and Type 1 that are a downlink resource allocation type of the above-described frequency domain, a PRG size is configured/indicated as 2 and a PRG set size is configured as 1. If the PRG set size is 1, one PRG set may be defined as a frequency resource related to one PRG configured/indicated to the UE. TCI states related to different TRPs may be alternately mapped to all the frequency resources scheduled for the UE based on DCI in units of PRG set. In other words, different TCI states may be mapped in units of PRG set, and the corresponding PRG set may be allocated to the TRP associated with each TCI state. For example, a PRG set mapped to TCI state 1 may be a resource allocated to TRP 1, and a PRG set mapped to TCI state 2 may be a resource allocated to TRP 2.

For example, if the PRG set size is 2, one PRG set may consist of two PRGs and may be alternately mapped to TCI states related to different TRPs in units of PRG set.

The example of FIG. 13 may be seen as a method in which TCI states related to different TRPs are alternately mapped in units of a certain PRG set based on a frequency resource scheduled for the UE. More characteristically, a first TCI state of two TCI states indicated to the UE may correspond to an odd-numbered PRG set, and a second TCI state may correspond to an even-numbered PRG set (based on a low frequency index in the frequency resources scheduled for the UE). Alternatively, the reverse order is also possible, and thus the first TCI state may correspond to the even-numbered PRG set and the second TCI state may correspond to the odd-numbered PRG set (based on the low frequency index in the frequency resource scheduled for the UE). Alternatively, the mapping order may be defined by a fixed rule, or may be configured/indicated via higher layer signaling and/or DCI signaling.

The above-described method has advantages in that a frequency diversity gain can be expected since frequency resources related to different TRPs are evenly spread in a scheduling band allocated to the UE via DCI, and the size of the frequency resources allocated to different TRPs can be adjusted by adjusting the PRG set size.

Method 2) The example of FIG. 13 proposes a method of defining PRG sets based on frequency resources scheduled for the UE and mapping different TCI states to an odd-numbered PRG set and an even-numbered PRG set. A method of defining a PRG set based on a bandwidth part (BWP) on which a PDSCH is transmitted, and defining a mapping relationship with a specific TCI state based on the PRG set is also possible.

Figure 14:
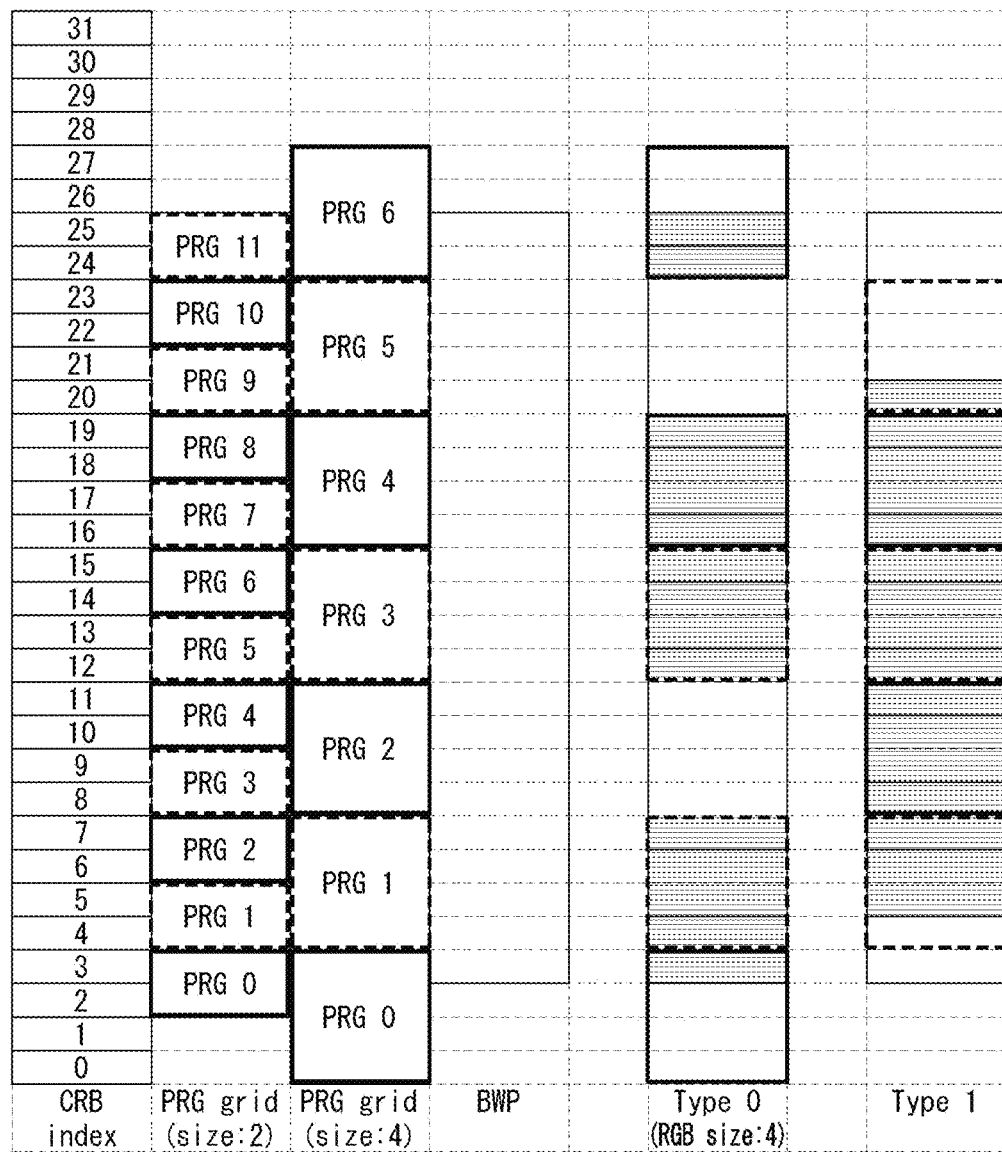
FIG. 14 illustrates an example of defining a PRG set based on a BWP on which a PDSCH can be transmitted, and a mapping relationship between the PRG set and a TCI state in accordance with methods described in the present disclosure.

FIG. 14 illustrates an example of defining a PRG set based on a BWP on which a PDSCH can be transmitted, and a mapping relationship between the PRG set and a TCI state in accordance with methods described in the present disclosure. FIG. 14 is merely an example for helping understanding of the present disclosure and does not limit the technical scope of the present disclosure.

FIG. 14 illustrates that for each of Type 0 (e.g., RBG size 4) and Type 1 that are a downlink resource allocation type of the above-described frequency domain, a PRG size is configured/indicated as 4 and a PRG set size is configured as 1. As can be seen from the case of the Type 0 of FIG. 14, since the PRG set is defined based on the BWP on which the PDSCH can be transmitted, the TCI state related to the same TRP may be related to the consecutive PRG sets within the frequency resource actually scheduled for the UE (unlike the above example of FIG. 13). For example, TCI state 1 may be equally mapped to a PRG sets subsequent to a PRG set mapped to the TCI state 1.

When compared to the method of FIG. 13, if the method of FIG. 14 is applied, there are advantages in that frequency resource domains can be semi-statically distinguished between different TRPs, and scheduling complexity in each TRP can be reduced and scheduling freedom can be increased since scheduling between TRPs does not affect each other.

In the examples of the above-described method 1/method 2/FIG. 13/FIG. 14, frequency resources related to different TRPs may overlap, partially overlap, or non-overlap in the time domain.

Method 3) If precoding granularity configured/indicated to the UE, that is, a size of the PRG corresponds to wideband, the UE does not expect to be scheduled with non-contiguous PRBs, and the UE may assume that the same precoding is applied to the allocated resources. In this case, a method of dividing equally or as evenly as possible a frequency resource domain allocated to the UE via DCI and mapping them to different TCI states may be considered.

Specifically, if precoding granularity is configured/indicated to the UE as wideband, a frequency resource corresponding to each TCI state may be allocated to the UE as a certain RB set/RBG set consisting of multiple contiguous resource blocks (RBs)/resource block groups (RBGs). In this instance, it may be characterized in that sizes of RB sets/RBG sets related to different TCI states are equal to each other or are as evenly as possible.

A specific mode may be configured/indicated to the UE based on signaling (e.g., higher layer signaling/DCI signaling) and/or rules and/or RNTI so that the UE operates according to the method. For example, if CRC check is successful via a specific RNTI, DCI for frequency resource allocation may be interpreted according to the proposed method.

Figure 15:
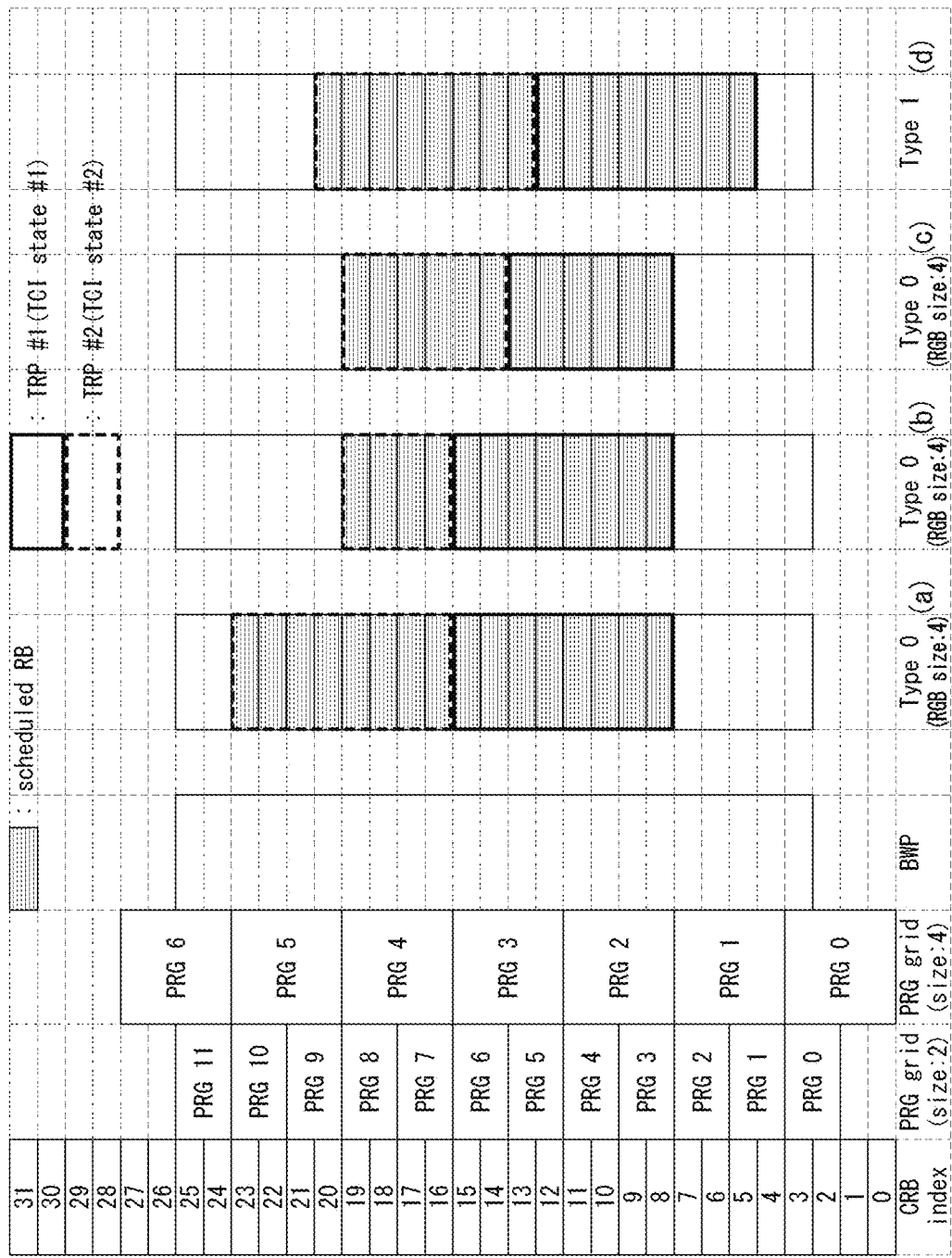
FIG. 15 illustrates an example of a method of mapping a TCI state related to each TRP according to a resource allocation method of a frequency domain for a PDSCH.

FIG. 15 illustrates an example of a method of mapping a TCI state associated with each TRP according to a resource allocation method of a frequency domain for a PDSCH. More specifically, FIG. 15 illustrates an example of a case where (a) 4 RBGs, (b) 3 RBGs, and (c) 3 RBGs are allocated to the UE for Type 0 (e.g., RBG size 4) and a case where (d) consecutive 16 RBs are allocated to the UE for Type 1. In the example of FIG. 15, frequency resources related to different TRPs may overlap, partially overlap, or non-overlap in the time domain. FIG. 15 is merely an example for helping understanding of the present disclosure and does not limit the technical scope of the present disclosure.

In the example of FIG. 15, if the UE is allocated (a) 4 RBGs in the Type 0, the UE may map the same frequency resource to different TRPs in units of RGB/RB. If the UE is allocated 3 RBGs (e.g., cases (b) and (c)), a size of a resource related to each TRP may vary depending on whether to divide in units of RGB (b) or in units of RGB (c). In the Type 1, frequency resources may be mapped to different TRPs in units of RB (d).

In both the Type 0 and Type 1, sizes of resources mapped to different TRPs may be different from each other depending on units of resource allocation. In this case, a size of a resource related to a specific TRP may be larger. To avoid this case, the base station can schedule resources so that the UE assumes that sizes of resources related to different TRPs are the same.

As in the example of FIG. 15, if a frequency resource domain allocated to the UE via single DCI is divided equally or as evenly as possible and is mapped to different TCI states, there is advantages being able to allocate consecutive frequency resources of a widest domain for each of the two TRPs and improve a channel estimation performance for a channel related to each TRP by providing the maximum PRG size. In the existing operation, the case where the precoding granularity is configured/indicated to the UE as wideband may be used for the purpose of helping a channel estimation method by notifying the UE that consecutive frequency resources to which the same precoding is applied are allocated. Therefore, when utilizing it, the case may be used for the purpose of indicating that consecutive frequency resources to which the same precoding is applied to each of the different TRPs are allocated as in the above proposed operation.

In addition, for example, for the method 3, a first TCI state of two TCI states indicated to the UE may correspond to a first RB set/RBG set, and a second TCI state may correspond to a second RB set/RBG set (based on a low frequency index in the frequency resources scheduled for the UE). (The reverse order is also possible, and the mapping order may be defined by a fixed rule, or may be configured/indicated via higher layer signaling and/or DCI signaling.)

As in the method 3, if different frequency resources, more characteristically, different RB sets/RBG sets are mapped to different TCI states indicated to the UE, the PRG, i.e., the precoding granularity may be defined by the corresponding RB set/RBG set from a UE perspective.

For example, when PRG='Wideband' is configured and the number of TCI states is greater than 1 (i.e., >1), the UE may assume that only an antenna port included in a band corresponding to the 'scheduled BW/number of TCI states' is the same antenna port. And/or, the UE assumes that PRG='scheduled BW/number of TCI states'. Alternatively, separate precoding granularity may be defined to support the above operation. For example, separate precoding granularity of PRG='sub_wideband'='scheduled BW/number of TCI states' can be defined, and the UE to which the corresponding granularity is configured/indicated may perform the proposed operation.

In the above example, a reason that the resource domain corresponding to each TCI state can be expressed as the RB set/RBG set is as follows. There are Type 0 and Type 1 as a method of allocating frequency resources to the UE. In the Type 0, an RBG consisting of multiple RBs is defined as a resource unit, and frequency resources may be allocated based on a bitmap scheme defined in units of RBG. In the Type 1, frequency resources consisting of consecutive RBs may be allocated in units of RB. As such, since the minimum unit of frequency allocation may vary depending on the frequency resource allocation method, as in the above-described proposal method, the minimum unit of frequency allocation for defining frequency resources related to different TCI states may vary depending on the frequency allocation method.

A method of defining equally or as evenly as possible the size of the RB set/RBG set related to the different TCI states may be described below.

For a resource allocation method of a frequency domain of the Type 0, the total number of RBGs scheduled for the UE via DCI may be expressed as $N_{RBG}^{sched}$.

If $mod(N_{RBG}^{sched}, 2)=0$, the number of RBGs of an RB set related to each TCI state may be $N_{RBG}^{sched}/2$, and a size of a frequency resource related to each TCI state may be equally allocated.

If $mod(N_{RBG}^{sched}, 2) \neq 0$, the number of RBGs of an RB set related to TCI state #1 may be $\lceil N_{RBG}^{sched}/2 \rceil$, and the number of RBGs of an RB set related to TCI state #2 may be $\lceil N_{RBG}^{sched}/2 \rceil - 1$, where $\lceil \ \rceil$ means a ceil operation, and the corresponding operation may be replaced by floor/round, etc.

For a resource allocation method of a frequency domain of the Type 1, the number of consecutive RBs scheduled for the UE via DCI may be expressed as $L_{RBs}$.

If $mod(L_{RBs}, 2)=0$, the number of RBGs of an RB set related to each TCI state may be $L_{RBs}/2$, and a size of a frequency resource related to each TCI state may be equally allocated.

If $mod(L_{RBs}, 2) \neq 0$, the number of RBGs of an RB set related to TCI state #1 may be $\lceil L_{RBs}/2 \rceil$, and the number of RBGs of an RB set related to TCI state #2 may be $\lceil L_{RBs}/2 \rceil - 1$.

In the above description, $\lceil \ \rceil$ means a ceil operation, and the corresponding operation may be replaced by floor/round, etc.

A method of defining a reference FR for TB calculation is described based on the methods (e.g., methods 1/2/3, etc.) of the above-described proposal 1.

In the 'reference FR definition method 1' for the FRA method 1 described in the proposal 1, i.e., when considering all the frequency resources allocated to multiple TRPs, since the frequency resource indicated via DCI coincides with a sum of frequency resources used for PDSCH transmission via different TRPs, a method of calculating the current TB size may be used as it is.

On the other hand, in the 'reference FR definition method 2' for the FRA method 1 described in the proposal 1, i.e., when considering only the frequency resource allocated to a specific TRP, a method is necessary to determine the TB size calculation based on the frequency resource to mapped to which TCI state related to which TRP when the UE calculates the transport block (TB) size.

The UE can know how a TCI state related to each TRP is mapped to frequency resource scheduled via single DCI according to the methods of the proposal 1 and/or the embodiments. Therefore, when the UE calculates the TB size, the UE can calculate the TB size based on a frequency resource to which a TCI state related to a specific TRP is mapped based on signaling (e.g., higher layer signaling/DCI) and/or rules between the base station and the UE.

For example, a rule of defining a frequency resource mapped to a specific TCI state as a reference resource for TB size calculation may be defined between the base station and the UE. As an example, the UE may define to calculate the TB size based on a frequency resource mapped to a first TCI state. According to the current standard, frequency resources scheduled via DCI are applied to the TB size calculation, but if the above method is applied, only a part of the frequency resources scheduled via DCI may be applied to the TB size calculation.

The above example has described an example of calculating the TB size based on a frequency resource mapped to 'a first TCI state', but it may be defined to calculate the TB size based on a frequency resource mapped to a second TCI state. That is, one of two TCI states (e.g., the first TCI state and the second TCI state) may be selected by a fixed rule, and it may be defined to calculate the TB size based on a frequency resource corresponding to the selected TCI state.

As another example, a method for a base station to transmit, to a UE, information for a specific TRP (or specific TCI state) that is basic for the TB size calculation may also be considered. For example, the information may be transmitted using the existing defined DCI field. If the method of the proposal 1 is applied, a field for DMRS port indication (e.g., 'Antenna port(s)' field) can be reduced by optimizing a DMRS table. Thus, a part (e.g., MSB(s)/LSB(s)) of bits for defining the existing field for DMRS port indication can be used for the above object.

The field for DMRS port indication described in the above example is merely an example and does not limit the technical scope of the present disclosure. Thus, another specific field within DCI may be used in addition to the field for DMRS port indication. The existing field defined in the current standard may also be used, or a new field for the above proposal may also be defined.

For example, the UE may select a reference frequency resource for the TB size calculation based on the size of frequency resources (e.g., the number of PRBs, etc.) mapped to the same TCI state. As an example, the UE may select a frequency resource based on the number of PRBs mapped to each TCI state to calculate the TB size. The UE may determine a frequency resource corresponding to a TCI state to which more or fewer PRBs are mapped (/allocated) as a reference resource for the TB size calculation, and may calculate the TB size based on the determined reference resource.

As another example, an index of the frequency resource mapped to the same TCI state may be a reference in order to select the frequency resource for calculating the TB size. For example, the UE may calculate the TB size based on a frequency resource corresponding to a TCI state mapped (/allocated) to a lowest or highest index.

As described above, in the 'reference FR definition method 2' for the 'FRA method 1', i.e., if only a frequency resource (allocated to a specific TRP) to which a specific TCI state is mapped is used for the TB size calculation, (i) PDSCH (e.g., PDSCH 1) transmitted via a frequency resource applied to the TB size calculation and (ii) PDSCH (e.g., PDSCH 2) transmitted via other resource may be distinguished. The PDSCH (e.g., PDSCH 2) transmitted via the other resource may be interpreted as a repeatedly transmitted PDSCH. In this instance, RV and/or modulation order of the PDSCH 1 and the PDSCH 2 may be different from each other. To this end, part (e.g., MSB(s)/LSB(s)) of the existing bits used in the field for DMRS port indication through the optimization of the DMRS table and/or a TB information field for indicating MCS/RV/NDI of a second TB may be differently interpreted.

Further, in addition to the methods and/or embodiments according to the 'FRA method 1' and the 'reference FR definition method 2', a rule for which modulation and coding scheme (MCS) value is used to calculate the TB size needs to be defined between the base station and the UE. The base station may indicate respective MCS values for TB 1/TB 2 to the UE via a field in DCI. A method of determining a specific value to be used for TB size calculation among multiple MCS values indicated to the UE via DCI may be necessary. A rule for determining a specific MCS value to be used for TB size calculation may be defined between the UE and the base station.

As an example, if a higher layer parameter, 'maxNrofCodeWordsScheduledByDCI' value, meaning the maximum number of CWs that can be scheduled by DCI is set to 1, the TB size may be calculated based on a MCS value indicated via a MCS field corresponding to TB 1.

As another example, if the 'maxNrofCodeWordsScheduledByDCI' value is set to 2, and the corresponding TB (e.g., TB1/TB2) is indicated as 'disabled' as values of MCS and RV fields corresponding to TB 1 or TB 2 are indicated as a specific value (i.e., MCS=26 and RV=1), the TB size may be calculated based on an MCS value indicated via the MCS field corresponding to a TB (e.g., TB1/TB2) indicated as 'enabled'.

As another example, if the 'maxNrofCodeWordsScheduledByDCI' value is set to 2 and both the two TBs (e.g., TB1 and TB2) are indicated as 'enabled', an MCS value to be applied for the TB size calculation may be determined based on a TCI state corresponding to the frequency resource selected above for calculating the TB size. For example, it may be assumed that a first TCI state corresponds to TB 1 and a second TCI state corresponds to TB 2. If the selected frequency resource for calculating the TB size corresponds to the first TCI state, the TB size may be calculated based on an MCS value indicated via an MCS field corresponding to the TB 1. If the selected frequency resource for calculating the TB size corresponds to the second TCI state, the TB size may be calculated based on an MCS value indicated via an MCS field corresponding to the TB 2.

The above example has assumed that the first TCI state corresponds to the TB 1 and the second TCI state corresponds to the TB 2, but it is obvious that the correspondence between the TCI state and the TB is not limited to the above example. For example, the correspondence between the TCI state and the TB may be defined by a specific relationship with a fixed rule between the base station and the UE, or may be configured/indicated to the UE via signaling of the base station.

As another example, if the 'maxNrofCodeWordsScheduledByDCI' value is set to 2 and both the two TBs (e.g., TB1 and TB2) are indicated as 'enabled', an MCS value to be applied for the TB size calculation may be determined based on the MCS value indicated via the MCS field corresponding to each TB. For example, the TB size may be calculated based on a lower or higher MCS value. Further, a frequency resource to be applied for the TB size calculation may be determined depending on the TB corresponding to the MCS field applied for the TB size calculation. For example, it may be assumed that a first TB 1 corresponds to a first TCI state and a second TB 2 corresponds to a second TCI state. If an MCS field selected for calculating the TB size corresponds to the TB 1, the TB size may be calculated based on a frequency resource corresponding to the first TCI state. If an MCS field selected for calculating the TB size corresponds to the TB 2, the TB size may be calculated based on a frequency resource corresponding to the second TCI state.

The above example has assumed that the TB 1 corresponds to the first TCI state and the TB 2 corresponds to the second TCI state, but it is obvious that the correspondence between the TB and the TCI state is not limited to the above example. For example, the correspondence between the TB and the TCI state may be defined by a specific relationship with a fixed rule between the base station and the UE, or may be configured/indicated to the UE via signaling of the base station.

As another example, if the 'maxNrofCodeWordsScheduledByDCI' value is set to 2 and both the two TBs (e.g., TB1 and TB2) are indicated as 'enabled', the TB size may be calculated based on an MCS value indicated via an MCS field corresponding to a specific TB. In this instance, the specific TB may be defined by the fixed rule between the base station and the UE, or may be configured/indicated to the UE via signaling of the base station. For example, the specific TB may be defined by the fixed rule so that the TB size is calculated based on an MCS value indicated in an MCS field corresponding to TB 1.

The frequency resource allocated via one DCI in the single DCI based M-TRP operation through the methods and/or embodiments of the proposal 1 described above may be distributed for each TRP through the mapping between the TCI state and the frequency resource. The reference frequency resource for the TB size calculation may also be determined through the methods and/or embodiments of the proposal 1 described above.

[Proposal 1-1]

In Proposal 1-1, a method of transmitting a phase-tracking reference signal (PTRS) at different TRPs is described based on the frequency resource configuration method and the reference resource configuration method for TB calculation of the proposal 1 described above.

In the 5G NR standard, the PTRS has been introduced to compensate for impairment generated by a phase noise in a high frequency band. This is because the phase noise causes a common phase error (CPE) and an inter-carrier interference (ICI) in a frequency domain.

Operations related to a DL PTRS and an UL PTRS are described in detail below. The detailed description related to the PTRS can be confirmed in clause 7.4.1.2 of TS38.211 and clause 5.1.6.3 of TS38.214.

Figure 16:
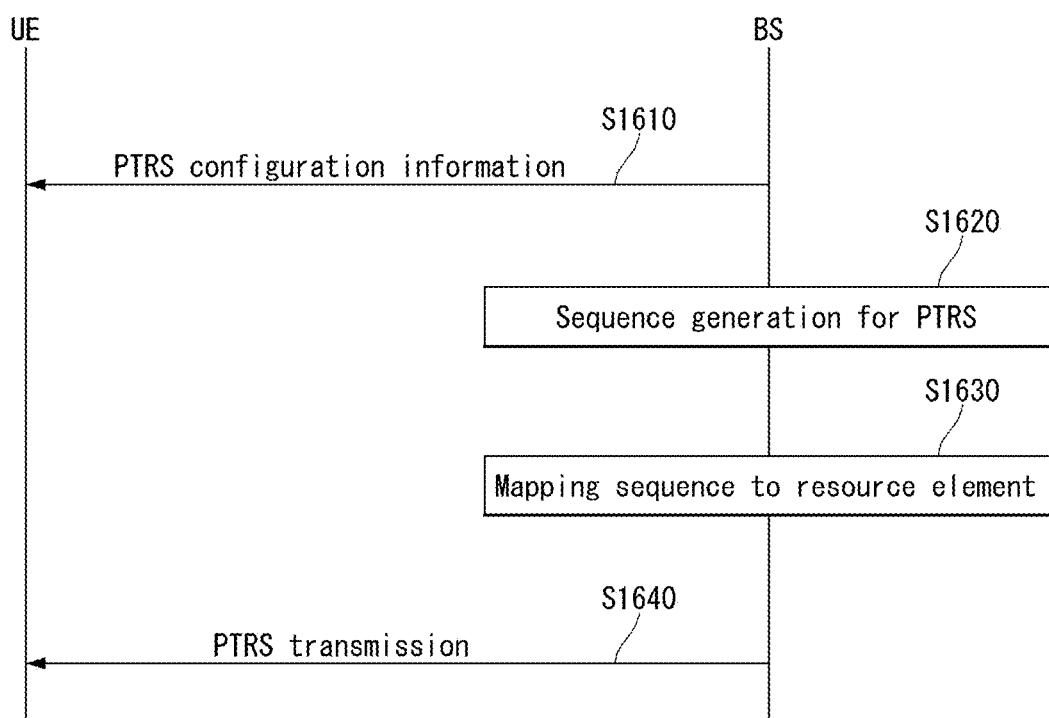
FIG. 16 is a flow chart illustrating an example of a DL PTRS procedure.

FIG. 16 is a flow chart illustrating an example of a DL PTRS procedure.

A base station transmits PTRS configuration information to a UE, in S1610. The PTRS configuration information may refer to PTRS-DownlinkConfig IE. The PTRS-DownlinkConfig IE may include frequencyDensity parameter, timeDensity parameter, epre-Ratio parameter, resourceElementOffset parameter, etc.

The frequencyDensity parameter is a parameter representing a presence and a frequency density of a DL PTRS as a function of scheduled BW. The timeDensity parameter is a parameter representing the presence and a time density of the DL PTRS as a function of modulation and coding scheme (MCS). The epre-Ratio parameter is a parameter representing an energy per resource element (EPRE) between a PTRS and a PDSCH.

The frequencyDensity parameter and the timeDensity parameter indicate thresholds ptrs-MCSi (i=1, 2, 3, and 4), and N_RB,i (i=0 and 1) of Tables 6 and 7. The Table 6 represents the time density of the PTRS as a function of scheduled MCS. The Table 7 represents the time density of the PTRS as a function of scheduled bandwidth.

TABLE 6

| Scheduled MCS | Time density ($L_{PT-RS}$) |
| --- | --- |
| $I_{MCS} <$ ptrs-MCS$_1$ | PT-RS is not present |
| ptrs-MCS1 ≤ $I_{MCS} <$ ptrs-MCS2 | 4 |
| ptrs-MCS2 ≤ $I_{MCS} <$ ptrs-MCS3 | 2 |
| ptrs-MCS3 ≤ $I_{MCS} <$ ptrs-MCS4 | 1 |

TABLE 7

| Scheduled bandwidth | Frequency density ($K_{PT-RS}$) |
| --- | --- |
| $N_{RB} < N_{RB0}$ | PT-RS is not present |
| $N_{RB0} ≤ N_{RB} < N_{RB1}$ | 2 |
| $N_{RB1} ≤ N_{RB}$ | 4 |

A pattern of the PTRS may be determined depending on a density of a frequency domain and a density of a time domain. The density of the frequency domain (i.e., the frequency density of the PTRS) may mean a spacing between the PTRSs (e.g., the number of RBs) in the frequency domain. The density of the time domain (i.e., the time density of the PTRS) may mean a spacing between the PTRSs (e.g., the number of symbols) in the time domain.

Referring to Tables 6 and 7, the time density of the PTRS may vary depending on an MCS scheduled for the UE, and the frequency density of the PTRS may vary depending on a bandwidth scheduled for the UE. The time density/frequency density of the PTRS may vary based on thresholds (e.g., ptrs-MCS1/2/3/4) of the MCS and thresholds (e.g., N_RB0/1) of the bandwidth configured via the PTRS configuration information (e.g., PTRS-DownlinkConfig).

The base station generates a sequence used for the PTRS, in S1620. As shown in Equation 5 below, the sequence for the PTRS is generated using a DMRS sequence of the same subcarrier. The sequence generation for the PTRS may be differently defined depending on whether transform precoding has been enabled, and Equation 5 below represents an example where the transform precoding is disabled.

$$r_k = r(2m+k')$$

[Equation 5]

Here, r(2m+k') is a DMRS given in a location $l_0$ and a subcarrier k.

That is, the sequence of the PTRS uses a sequence of the DMRS, and more specifically, the sequence of the PTRS in the subcarrier k is the same as a sequence of the DMRS in the subcarrier k.

The base station maps the generated sequence to a resource element, in S1630. Here, the resource element may mean including at least one of time, frequency, antenna port or code.

A location of the PTRS in the time domain starts from a starting symbol of PDSCH allocation and is mapped at a specific symbol spacing. If a DMRS symbol is present, the mapping is performed from a symbol next to the DMRS symbol. The specific symbol spacing may be 1, 2 or 4 symbols.

A frequency location of the PTRS in relation to resource element mapping of the PTRS is determined by a frequency location of an associated DMRS port and higher layer parameter UL-PTRS-RE-offset. Here, UL-PTRS-RE-offset is included in PTRS configuration and indicates a subcarrier offset for UL PTRS for CP-OFDM.

For DL, the PTRS port is related to a DMRS port of a lowest index among scheduled DMRS ports. And, for UL, the base station configures which DMRS port is related to the PTRS port via UL DCI.

The base station transmits the PTRS to the UE on a resource element, in S1640. The UE performs a compensation for a phase noise using the received PTRS.

An UL PTRS related operation is similar to the DL PTRS related operation mentioned above, and the names of the parameters related to the DL PTRS may be replaced by the names of the parameters related to the UL PTRS. That is, PTRS-DownlinkConfig IE may be replaced by PTRS-UplinkConfig IE, and in the DL PTRS related operation, the base station may be replaced by the UE and the UE may be replaced by the base station. In the same manner, the sequence generation for the PTRS may be differently defined depending on whether transform precoding has been enabled.

According to the methods and/or embodiments of the proposal 1 described above, if precoding granularity is configured/indicated to the UE as 2 or 4, a frequency resource corresponding to each TCI state is allocated to the UE in units of PRG set consisting of multiple PRG(s), and different TCI states alternately (intersecting) correspond to consecutive PRG sets, there may be a problem that the PTRS cannot be transmitted in a frequency resource corresponding to a specific TCI state. For example, if a spacing at which the PTRS is transmitted in the frequency domain depending on the frequency density of the PTRS is greater than one PRG set corresponding to the same TCI state, the PTRS may not be mapped to PRG sets of specific order.

Figure 17:
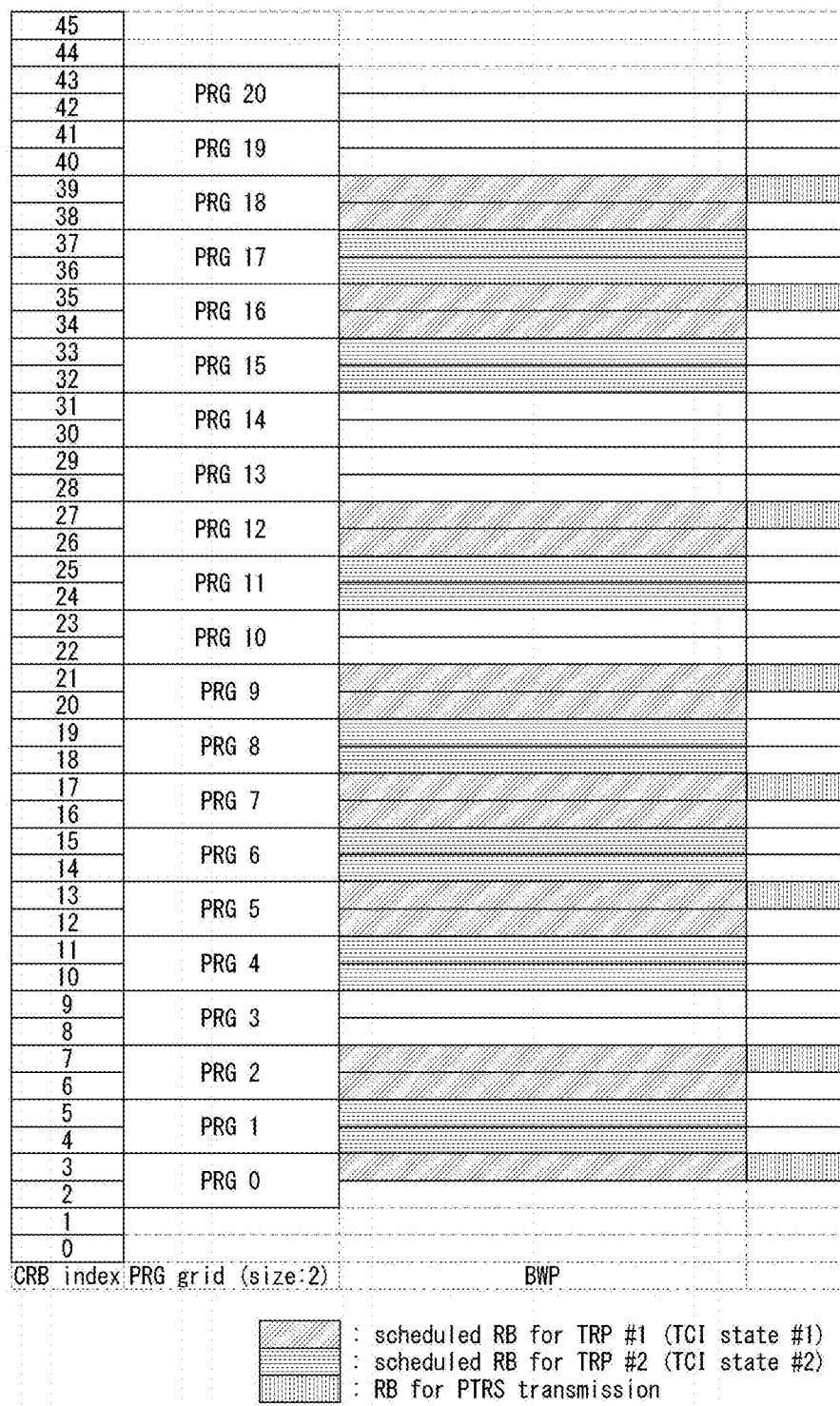
FIG. 17 illustrates an example of a mapping relationship between scheduled RBs and a TCI state corresponding to each TRP and an example of RBs on which PTRS is transmitted, when precoding granularity is configured as 2 in a frequency domain and a PRG set includes one PRG.

FIG. 17 illustrates an example of a mapping relationship between scheduled RBs and a TCI state corresponding to each TRP and an example of RBs on which PTRS is transmitted, when precoding granularity is configured as 2 in a frequency domain and a PRG set includes one PRG. In FIG. 17, a spacing at which PTRS is transmitted is 4 RBs.

FIG. 17 is merely an example for convenience of description and does not limit the technical scope of the present disclosure.

Referring to FIG. 17, PTRS is transmitted only in a frequency resource corresponding to a specific TRP (e.g., TRP #1). This is because a PTRS density of a frequency resource and a RB on which the PTRS is transmitted are defined to have to be determined based on the entire bandwidth scheduled to the UE via DCI according to the current standard. However, as in the above example, when the PTRS is transmitted only in the frequency resource corresponding to the specific TRP, if phase sources of different TRPs corresponding to different TCI states are different, large performance degradation may occur because an influence of a phase noise for data transmitted from the specific TRP cannot be compensated.

Accordingly, the proposal 1-1 of the present disclosure proposes a method (e.g., embodiments 1/2/3/4/5) of transmitting/receiving the PTRS in respective frequency resources corresponding to different TRPs, i.e., corresponding to different TCI states in order to solve the above problem. Hereinafter, methods to be described below may be independently performed, or one method may be combined and applied to another method, or partial configuration of one method may be applied by being replaced by partial/all configuration of another method. Further, methods and/or embodiments (e.g., embodiments 1/2/3/4/5) of the proposal 1-1 may be applied even if the precoding granularity is 2, 4 or wideband.

First, in FDM based M-TRP joint transmission, a method of determining a frequency density of the PTRS is described.

As described above, the frequency density of the PTRS may vary depending on a bandwidth scheduled for the UE (e.g., the number of scheduled RBs). The frequency density of the PTRS may vary depending based on thresholds (e.g. $N\_RB0/1$) of a bandwidth configured via PTRS configuration information (e.g., PTRS-DownlinkConfig). The frequency density of the PTRS may be determined based on the above-described Table 7. The frequency density of the PTRS may be determined through a comparison of thresholds (e.g., $N\_RB0/1$) configured via a scheduled bandwidth $N\_RB$ and a higher layer parameter. In the following description, a PTRS frequency domain density may mean $K\_PT\text{-}RS$ of the above Table 7. A bandwidth considered to determine the PTRS frequency domain density may mean $N\_RB$ (e.g., the number of resource blocks) of the above Table 7.

Embodiment 1) To determine a frequency domain density of a PTRS (i.e., a frequency density of the PTRS), a PTRS frequency domain density may be determined based on only a bandwidth corresponding to a specific TCI state among all bandwidths scheduled via DCI not all the bandwidths scheduled via the DCI.

For example, the bandwidth corresponding to the specific TCI state among all the bandwidths scheduled via the DCI may be a bandwidth corresponding to a first TCI state or a second TCI state. The specific TCI state may be defined by a fixed rule between a base station and a UE, or may be configured/indicated to the UE via high layer signaling and/or DCI signaling.

For example, by comparing the bandwidth (i.e., $N\_RB$) corresponding to the specific TCI state with thresholds (e.g., $N\_RB0/1$) configured by a parameter frequencyDensity, the frequency density (i.e., $K\_PT\text{-}RS$) of the PTRS may be determined according to the above Table 7. The bandwidth (i.e., $N\_RB$) corresponding to the specific TCI state may mean a resource blocks (e.g., PRB) to which the specific TCI state is mapped. Specifically, if the bandwidth (i.e., $N\_RB$) corresponding to the specific TCI state is less than $N\_RB0$, the PTRS may not exist. If the bandwidth (i.e., $N\_RB$) corresponding to the specific TCI state is greater than or equal to $N\_RB0$ and is less than $N\_RB1$, the frequency density of the PTRS may be 2. If the bandwidth (i.e., $N\_RB$) corresponding to the specific TCI state is greater than or equal to $N\_RB1$, the frequency density of the PTRS may be 4.

The base station/UE may transmit/receive the PTRS based on units of PTRS frequency domain density (e.g., $K\_PT\text{-}RS$ in Table 7) determined based on a bandwidth (e.g., $N\_RB$ in Table 7) including RBs corresponding to the specific TCI state. In addition, the base station/UE defining/determining a PTRS frequency domain density may transmit/receive the PTRS based on the PTRS frequency domain density.

If the above proposal is applied, the base station may define a PTRS frequency domain density optimized for a size of a frequency domain corresponding to each TRP, i.e., corresponding to each TCI state.

Embodiment 2) To determine a frequency domain density of a PTRS (i.e., a frequency density of the PTRS), a PTRS frequency domain density may be determined based on a bandwidth corresponding to each TCI state related to each TRP among all bandwidths scheduled. In other words, the frequency domain density of the PTRS may be defined for each bandwidth corresponding to a specific TCI state. The bandwidth corresponding to the specific TCI state may be a resource blocks (e.g., PRB) to which the specific TCI state is mapped.

For example, a first PTRS frequency domain density may be determined for a bandwidth corresponding to TCI state 1, and a second PTRS frequency domain density may be determined for a bandwidth corresponding to TCI state 2. The first PTRS frequency domain density and the second PTRS frequency domain density may have the same vale or different values.

For example, the bandwidth corresponding to the TCI state 1 is denoted by first $N\_RB$, and the bandwidth corresponding to the TCI state 2 is denoted by second $N\_RB$. By comparing thresholds (e.g., $N\_RB0/1$) configured by a parameter frequencyDensity with the first $N\_RB$ and the second $N\_RB$, the frequency density (i.e., $K\_PT\text{-}RS$) of the PTRS may be determined according to the above Table 7. Specifically, if the first $N\_RB$/second $N\_RB$ are less than $N\_RB0$, the PTRS may not exist. If the first $N\_RB$/second $N\_RB$ are greater than or equal to $N\_RB0$ and are less than $N\_RB1$, the frequency density of the PTRS may be 2. If the first $N\_RB$/second $N\_RB$ are greater than or equal to $N\_RB1$, the frequency density of the PTRS may be 4.

For all the frequency resources scheduled via DCI based on the 'FRA method 1' described in the proposal 1, the frequency resource of each TRP may be determined by mapping a TCI state related to each TRP to the frequency resource. For example, it may be assumed that a frequency resource domain of TRP 1 is called FRG #1 and the TCI state 1 is mapped to FRG #1, and a frequency resource domain of TRP 2 is called FRG #2 and the TCI state 2 is mapped to FRG #2. In this case, a PTRS frequency density (e.g., first PTRS frequency domain density) determined based on a bandwidth (e.g., first $N\_RB$) corresponding to the TCI state 1 may be applied in the FRG #1, and a PTRS frequency density (e.g., second PTRS frequency domain density) determined based on a bandwidth (e.g., second $N\_RB$) corresponding to the TCI state 2 may be applied in the FRG #2.

If different PTRS frequency domain densities for different frequency domains corresponding to different TCI states are determined according to the method of the Embodiment 2, there is an advantage of being able to apply a PTRS frequency domain density optimized for each frequency domain resource.

In the Embodiment 2, a parameter (e.g., frequencyDensity) for determining the frequency density of the PTRS is commonly configured, and the same threshold criterion has been applied to calculate the frequency densities of the bandwidth (e.g., first N_RB) corresponding to the TCI state 1 and the bandwidth (e.g., second N_RB) corresponding to the TCI state 2. In addition, to define each PTRS frequency domain density for a bandwidth corresponding to a specific TCI state, multiple parameters for determining the frequency domain density may also be defined. Each parameter may be applied to calculate a PTRS frequency density for respective bandwidths corresponding to different TCI states.

For example, a parameter frequencyDensity within PTRS-DownlinkConfig configured via higher layer signaling may be extended to frequencyDensity-1/2, frequencyDensity-1 may be applied to define a PTRS frequency domain density within a bandwidth corresponding to a first TCI state, and frequencyDensity-2 may be applied to define a PTRS frequency domain density within a bandwidth corresponding to a second TCI state. The base station may configure, to the UE, a plurality of parameters (e.g., frequencyDensity) for frequency density determination. Each parameter may be used to sequentially determine the frequency density of the PTRS within a bandwidth corresponding to the TCI state.

Embodiment 3) To determine a frequency domain density of a PTRS (i.e., a frequency density of the PTRS), the frequency domain density of the PTRS may be determined based on bandwidths corresponding to a half of all bandwidths scheduled via DCI among all the bandwidths scheduled via the DCI not all the bandwidths scheduled via the DCI.

For example, if the number of all the bandwidths scheduled via the DCI is odd, a specific value may be calculated through rounding operation, rounding down operation, or rounding up operation, and the frequency domain density of the PTRS may be determined based on the calculated bandwidth.

If the method of the Embodiment 3 is applied, there is an advantage of being able to determine the frequency domain density of the PTRS through a simple fixed rule.

Embodiment 4) According to the method of the proposal 1, if frequency resources for all TRPs are allocated to a UE via DCI and are divided into sub-resource groups in which scheduled frequency resources are mapped to different TCI states, a frequency domain density of a PTRS may be defined as a specific value. The specific value may be (i) a value defined by a fixed rule between a base station and the UE or (ii) a value configured via signaling (e.g., RRC/MAC-CE/DCI, etc.) between the base station and the UE.

For example, the specific value may be configured/defined as a frequency domain density with a smallest spacing. Referring to Table 7, the frequency domain density with the smallest spacing may be 2. If the frequency domain density with the smallest spacing is applied as described above, there may not be a case in which a spacing at which the PTRS is transmitted in a frequency domain is greater than one PRG set to correspond to the same TCI state, when assuming that a size of a smallest PRG set can become 2 PRBs. Therefore, respective PTRS transmissions are possible at different TRPs.

As in the above example, when the frequency domain density of the PTRS is defined as the specific value irrespective of the number of RBs scheduled, if the number of RBs scheduled for the UE is less than the specific value, the PTRS may not be transmitted. Considering that the frequency domain density of the PTRS is determined depending on the number of RBs scheduled for the UE, there may be a disadvantage in that defining the frequency domain density of the PTRS as the specific value irrespective of the number of RBs scheduled increases an unnecessary RS overhead.

Accordingly, this embodiment can prevent a situation in which the PTRS is transmitted only in a frequency resource corresponding to a specific TRP by limiting a maximum value of the frequency domain density while maintaining the existing operation in which the frequency domain density of the PTRS is determined depending on the number of RBs scheduled.

To this end, the maximum value of the frequency domain density of the PTRS may be defined as the specific value. The specific value may be (i) a value defined by the fixed rule between the base station and the UE or (ii) a value configured via signaling (e.g., RRC/MAC-CE/DCI, etc.) between the base station and the UE.

For example, the maximum value (i.e., the specific value) of the frequency domain density of the PTRS may be 2. In this case, the maximum value can be prevented from being set to 4 that is a maximum spacing, and respective PTRS transmissions are possible at different TRPs.

Whether to apply the methods of the Embodiment 4 may be determined depending on precoding granularity configured/indicated to the UE. For example, if the precoding granularity is configured/indicated to the UE as 4, respective PTRS transmissions are possible at different TRPs even when the frequency domain density of the PTRS is determined as 4. On the other hand, if the precoding granularity is configured/indicated to the UE as 2, there may be a case in which the PTRS cannot be transmitted at a specific TRP when the frequency domain density of the PTRS is determined as 4. Thus, only if the precoding granularity is configured/indicated to the UE as 2, it can be ensured that respective PTRS transmissions are possible at different TRPs by applying the frequency domain density of the PTRS as the specific value to fix the frequency domain density of the PTRS to 2 or by applying/limiting the maximum value of the frequency domain density of the PTRS to the specific value (e.g., 2).

As described in FIG. 16, the PTRS may be mapped to a resource element and received. Here, the resource element may mean including at least one of time, frequency, antenna port, or code. A frequency location of the PTRS (i.e., resource mapping of the frequency domain) may be determined by a frequency location of associated DMRS port and a higher layer parameter UL-PTRS-RE-offset. Here, UL-PTRS-RE-offset is included in PTRS configuration and indicates subcarrier offset for UL PTRS for CP-OFDM.

Based on S-TRP transmission in the current standard, a transmission location of the PTRS is determined based on all bandwidths scheduled via the DCI. However, in FDM based M-TRP joint transmission, a resource location of a frequency domain of the PTRS may be independently determined within a bandwidth corresponding to each TCI state among all the bandwidths scheduled via the DCI not all the bandwidths scheduled via the DCI. That is, all the frequency resources (e.g., bandwidths) scheduled via the DCI may be divided into two or more subgroups, and respective subgroups may correspond to different TCI states. The resource location of the frequency domain of the PTRS may be determined based on the bandwidths of the subgroup corresponding to each TCI state.

In other words, in the FDM based M-TRP transmission, a plurality of (e.g., two) TCI states may be indicated via a TCI field of the DCI, and resource element mapping in the frequency domain of the PTRS may be related to the bandwidths (e.g., PRBs) allocated for each TCI state.

For example, as described in the proposal 1, if precoding granularity is 'wideband', all the RBGs/consecutive RBs scheduled via the DCI may be evenly allocated for each TRP (i.e., each mapped TCI state). As an example, a bandwidth (or frequency resource) related to TCI state #1 may be [X/2], and remaining resources [/2]-1 may be bandwidths (or frequency resources) related to TCI state #2. Here, X may denote the number $N_{RBG}^{sched}$ of all the RBGs scheduled via the DCI, or the number $L_{RB}$s of consecutive RBs scheduled via the DCI. The PTRS may be mapped based on the bandwidths (e.g., PRBs) allocated for each TCI state.

For example, as described in the proposal 1, if precoding granularity is '2 or 4', a first TCI state may correspond to an even-numbered PRG set (based on a low frequency index in the frequency resources scheduled for the UE), and a second TCI state may correspond to an odd-numbered PRG set. The PTRS may be mapped based on the bandwidth (e.g., PRBs) allocated for each TCI state.

The method of independently determining the transmission location within the bandwidth corresponding to each TCI state among all the bandwidths scheduled via the DCI may be applied to together with the method (e.g., Embodiments 1/2/3/4) of determining the frequency domain density of the PTRS described above.

For example, based on the above-described Embodiment 2, different frequency domain densities may be determined within the bandwidth corresponding to each TCI state, and the transmission location of the PTRS may be determined based on each frequency density. The base station/UE may transmit/receive the PTRS based on units of PTRS frequency domain density (e.g., K_PT-RS of Table 7) determined based on a bandwidth (e.g., N_RB of Table 7) including RBs corresponding to a specific TCI state. In addition, the base station/UE defining/determining a PTRS frequency domain density may transmit/receive the PTRS based on the PTRS frequency domain density. In other words, the PTRS may be mapped and received depending on a frequency density determined by the number of resource blocks (bandwidths) related to each TCI state in resource blocks (bandwidths) allocated for each TCI state.

Embodiment 5) As another example, a base station may not configure, to a UE, a combination of a frequency domain density of a PTRS and a size of PRG and PRG set that may cause the above-mentioned problem. That is, the base station may transmit the PTRS depending on the frequency domain density and a location determination method of the PTRS defined in the current standard, and the UE may assume that the PTRS is transmitted in each of resource domains corresponding to different TCI states.

According to the Embodiment 5, a PTRS frequency domain density that is not suitable for a size of the frequency domain corresponding to different TRPs, i.e., corresponding to different TCI states may be applied. For example, even in an environment where the frequency domain density may decrease, i.e., even in an environment where a spacing of the PTRS may increase in the frequency domain, a PTRS frequency domain density corresponding to each TRP may increase. That is, the PTRS is transmitted at a small spacing in the frequency domain corresponding to a specific TRP (or TCI state), thereby unnecessarily increasing an RS overhead and reducing a spectral efficiency. Alternatively, on the contrary, even in an environment where the frequency domain density has to increase, i.e., even in an environment where the spacing of the PTRS has to decrease in the frequency domain, a PTRS frequency domain density corresponding to each TRP may decrease. Because the frequency domain density of the PTRS is calculated based on all bands scheduled via DCI, as a result, it is determined as a low density. However, the actual frequency domain corresponding to the specific TRP (or TCI state) may be less than this, and thus may require the high frequency domain density. If the suitable PTRS frequency domain density is not supported as above, it cannot adequately compensate for impairment due to a phase noise and degrades BLER performance, thereby reducing throughput.

The proposal method may applied to all the cases in which the precoding granularity is 2, 4, wideband.

<Proposal 2>

Proposal 2 in which a frequency resource is configured/indicated for a specific TRP among M-TRP operating in CoMP via single DCI as in 'FRA method 2' describe above describes a method of determining a frequency resource for another TRP based on the configured frequency resource.

The proposal 2 also assumes a single DCI based M-TRP operation and is described focusing on a situation where two TRPs operate in NCJT for convenience of description. It is obvious that the proposal 2 can be applied even when two or more TRPs operate.

A frequency resource for a specific TRP may be allocated to the UE via a frequency resource allocation field of DCI, and the allocated frequency resource may be mapped to a TCI state related to a specific TRP. For example, a resource allocated via DCI may be a frequency resource for a TRP transmitting the DCI. A frequency resource to which a TCI state related to other TRP is mapped may be defined based on the frequency resource.

For example, a difference value from a reference frequency resource (i.e., resource allocated via DCI) may be signaled (e.g., higher layer signaled/DCI signaled) to the UE, and a frequency resource of the other TRP may be determined based on the difference value. Alternatively, the frequency resource to which the TCI state related to the other TRP is mapped may be defined by a fixed rule between the base station and the UE.

A specific mode may be configured/indicated to the UE based on signaling (e.g., higher layer signaling/DCI signaling) and/or a rule and/or RNTI so that the UE operates according to the proposal 2. As an example, if a CRC check is successful via a specific RNTI, the DCI for frequency resource allocation may be interpreted according to the proposed method.

For example, a rule may be defined so that it is assumed that resources of the same size are directly concatenated and transmitted based on a resource of a frequency domain indicated to the UE via DCI. The UE may map a first TCI state to the resources of the frequency domain indicated via the DCI and map a second TCI state to the concatenated resources of the same size.

Figure 18:
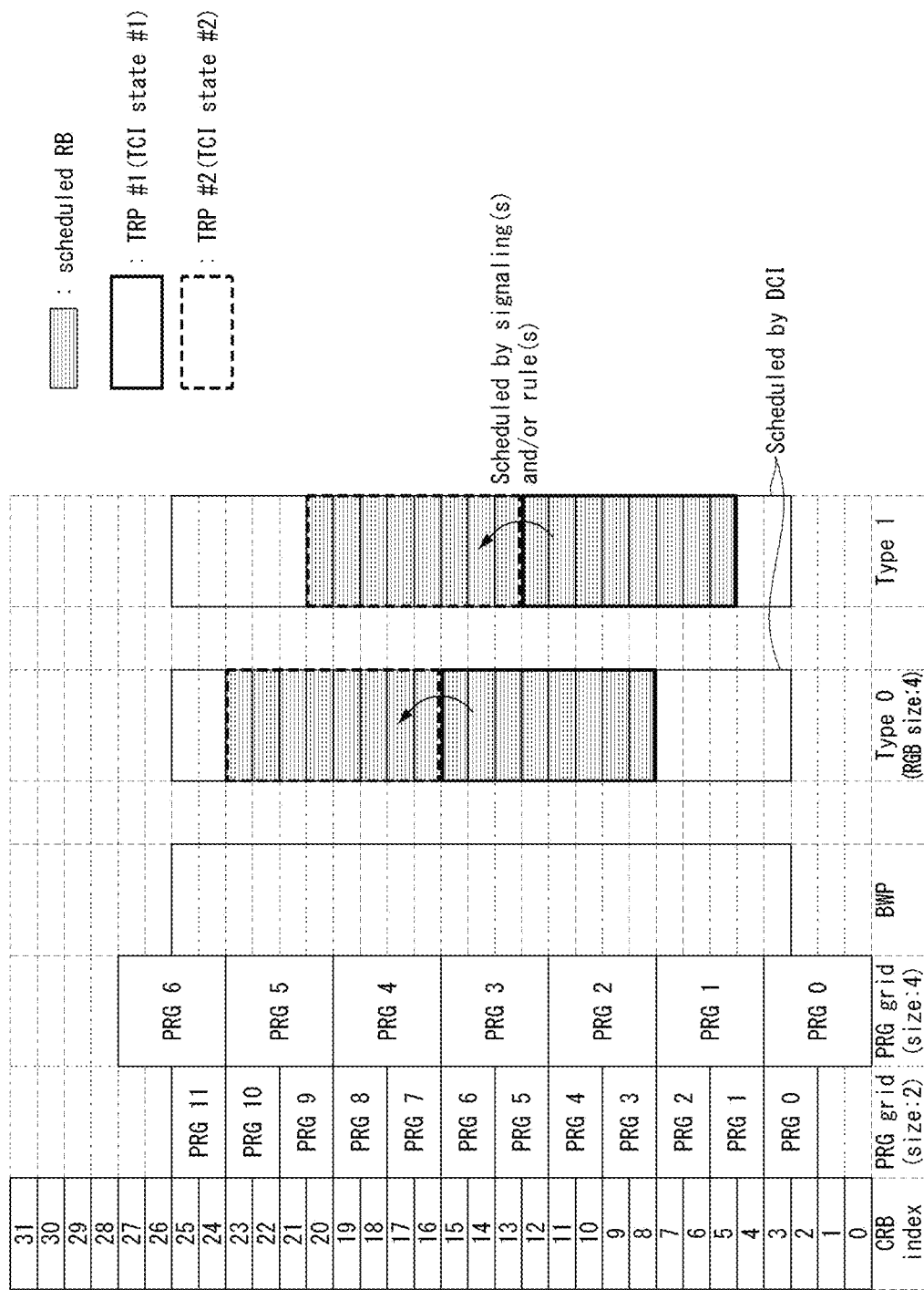
FIG. 18 illustrates an example of a method of determining a frequency resource of M-TRP based on a frequency resource indicated via DCI according to methods described in the present disclosure.

FIG. 18 illustrates an example of a method of determining a frequency resource of M-TRP based on a frequency resource indicated via DCI according to methods described in the present disclosure. FIG. 18 is merely an example for convenience of description and does not limit the technical scope of the present disclosure. Referring to FIG. 18, a frequency resource for TRP #1 may be indicated via DCI, and TCI state #1 related to the TRP #1 may be mapped to the frequency resource. Further, a frequency resource for TRP #2 may be concatenated to the frequency resource for the TRP #1 to form the same size, and TCI state #2 related to the TRP #2 may be mapped to the frequency resource.

As another example, the use of some fields in the existing DCI may be changed and applied to a use for indicating the difference value. The base station may signal a difference value from a resource indicated via the frequency resource allocation field via some fields of the DCI. Examples of some fields may include some bit(s) of a field for DMRS port indication and/or some bit(s) of a field (for MCS/NDI/RV) for indicating second TB information.

Based on the proposal 2, a method of defining a reference FR for TB calculation is described.

When considering the 'reference FR definition method 2' for the FRA method 2 described in the proposal 2, i.e., only a frequency resource allocated to a specific TRP, the current TB size calculation scheme may be used as it is by defining partial rule for the UE operation because a frequency resource indicated via DCI is identical to a frequency resource used for PDSCH transmission via the specific TRP. For example, if both a TB information field (for MCS1/RV1/NDI1) for a first TB and a TB information field (for MCS2/RV2/NDI2) for a second TB are used within the DCI, based on a specific field value, for example, based on the first TB information field, the TB size may be calculated based on frequency resources scheduled via the DCI.

number of TRPs may be the same as the number of TCI states indicated to the UE. Accordingly, the UE can know the size of all the frequency resources used for PDSCH transmission. When the size of the frequency resource scheduled via DCI is denoted by B, the size of all the frequency resources is equal to the product of B and the number of TCI states (B*number of TCIs). Thus, the UE may define to calculate the TB size based on a frequency resource size obtained by multiplying the number of TCI states and B which denotes the size of all the frequency resources used for the PDSCH transmission. According to the current standard, the frequency resources scheduled via the DCI are applied to the TB size calculation, but when the above method is applied, the multiple of the frequency resources scheduled via the DCI is applied to the TB size calculation.

Based on the frequency resource for a specific TRP allocated via one DCI in the single DCI based M-TRP operation through the methods and/or embodiments of the above-described proposal 2, a frequency resource for other TRP may be determined. A reference frequency resource for the TB size calculation may be determined through the methods and/or embodiments of the above-described proposal 2.

Referring to the document TS 38.211, an antenna port and quasi co-located (QCL) are defined as in Table 8.

TABLE 8

An antenna port is defined such that the channel over which a symbol on the antenna port is conveyed can be inferred from the channel over which another symbol on the same antenna port is conveyed.
For DM-RS associated with a PDSCH, the channel over which a PDSCH symbol on one antenna port is conveyed can be inferred from the channel over which a DM-RS symbol on the same antenna port is conveyed only if the two symbols are within the same resource as the
scheduled PDSCH, in the same slot, and in the same PRG as described in clause 5.1.2.3 of [6, TS 38.214].
Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

If only a frequency resource to which a specific TCI state is mapped is used for the TB size calculation as described above, a PDSCH transmitted via the frequency resource applied to the TB size calculation may be called PDSCH 1, and a PDSCH transmitted via other resource may be interpreted as a repeatedly transmitted PDSCH and may be called PDSCH 2. In this instance, the RV and/or modulation order of the PDSCH 1 and the PDSCH 2 may be different from each other. To this end, some (e.g., MSB(s)/LSB(s)) of the existing bits used in the field for DMRS port indication through the optimization of the DMRS table and/or the TB information field for indicating the MCS/RV/NDI of the second TB may be differently interpreted.

When considering the 'reference FR definition method 1' for the FRA method 2 described in the proposal 2, i.e., all the frequency resources allocated to multiple TRP, an additional UE operation is required.

Accordingly, when the UE calculates the TB size, there is proposed a method of defining/configuring to calculate the TB size based on N times the frequency resource scheduled via the DCI. In this instance, N may be the same as the number of TCI states indicated to the UE.

The UE can know the number of TRPs transmitting the PDSCH according to the method of the proposal 2, and the In order to apply the above-described methods and/or embodiments (e.g., proposal 1/proposal 1-1/proposal 2, etc.), the QCL definition of FIG. 8 may be partially modified as shown Table 9. The modified part is the part marked with an underline.

TABLE 9

Two antenna ports are said to be quasi co-located (with respect to the specific RB set) if the large-scale properties of the channel over which a symbol on one antenna port within a same QCL-f-RB set is conveyed can be inferred from the channel over which a symbol on the other antenna
port is conveyed. The large-scale properties include one or more of delay spread, Doppler spread, Doppler shift, average gain, average delay, and spatial Rx parameters.

Referring to Table 9, "QCL-f-RB set" may mean an RB set (a set of frequency resources) that may assume/apply the same QCL reference RS (and/or antenna port) for a target antenna port. The number of contiguous RBs within the RB set may be equal to or greater than the PRG size. The proposed methods and/or embodiments (e.g., proposal 1/proposal 1-1/proposal 2, etc.) described above may be seen an example of a method of constructing the QCL-f-RB set. That is, according the proposed methods and/or embodiments (e.g., proposal 1/proposal 1-1/proposal 2, etc.) described above, a frequency resource to which a specific TCI state is mapped may be determined, and the frequency resource to which the specific TCI state is mapped may correspond to the QCL-f-RB set.

In the proposed methods and/or embodiments (e.g., proposal 1/proposal 1-1/proposal 2, etc.) described above, it may be defined so that the proposed method is applied to frequency resources to be mapped to TCI states related to different TRPs in a specific unit (VRB or PRB) among a virtual resource block (VRB) or a physical resource block (PRB). Alternatively, it may be defined to select the unit (VRB or PRB) to which the proposal is applied through signaling (e.g., higher layer signaling/DCI) and/or a rule.

In the methods and/or embodiments (e.g., proposal 1/proposal 1-1/proposal 2, etc.) described in the present disclosure, the joint transmission operation of two different TRPs has been assumed, but the methods and/or embodiments described in the present disclosure can be applied to multiple, e.g., three or more TRPs. The proposed methods and/or embodiments (e.g., proposal 1/proposal 1-1/proposal 2, etc.) described above have been described based on multiple TRPs, but can be equally applied to transmission across multiple panel. The methods and/or embodiments (e.g., proposal 1/proposal 1-1/proposal 2, etc.) described in the present disclosure have been described focusing on the single DCI based M-TRP transmission, but can be applied to the multiple DCI based M-TRP transmission/reception transmitting DCI in remaining TRPs excluding some TRPs of multiple TRPs.

Figure 19:
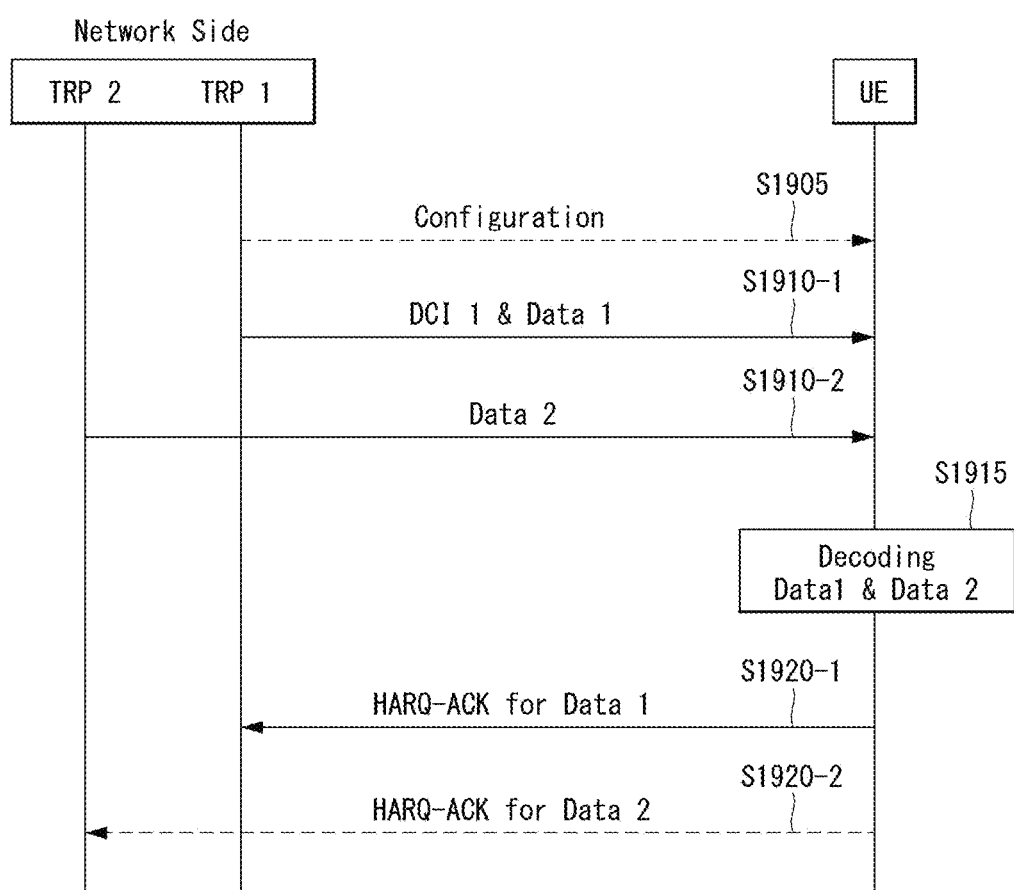
FIG. 19 illustrates an example of signaling between a UE and a network side in a single DCI based M-TRP transmission to which methods and/or embodiments described in the present disclosure are applicable.

FIG. 19 illustrates signaling when a UE receives single DCI (i.e., when a representative TRP transmits DCI to the UE) in a situation of M-TRP (or M-cell, hereinafter all TRPs may be replaced with cells, or case where multiple CORESETs (/CORESET groups) are configured from one TRP may be assumed as M-TRP). FIG. 19 is merely an example for convenience of description and does not limit the technical scope of the present disclosure.

Although the following description will be given with respect to "TRP", "TRP" may be replaced with other expressions such as a panel, an antenna array, a cell (e.g., macro cell/small cell/pico cell), a TP (transmission point), and a base station (gNB). Also, as described above, the TRPs may be divided according to information (e.g., index, ID) on a CORESET group (or CORESET pool). For example, if one UE is configured to perform transmission and reception to and from multiple TRPs (or cells), this may mean that multiple CORESET groups (or CORESET pools) are configured for one UE. Such a configuration for CORESET groups (or CORESET pools) may be performed via higher layer signaling (e.g., RRC signaling).

Referring to FIG. 19, signaling between two TRPs and the UE is considered for the convenience of explanation, but this signaling method can be extendedly applied to signaling between multiple TRPs and multiple UEs. In the description below, a network side may be a base station including a plurality of TRPs or a cell including a plurality of TRPs. For example, ideal/non-ideal backhaul may be configured between TRP 1 and TRP 2 constituting the network side. Further, the description below is described based on multiple TRPs, but this can be extendedly applied to transmission through multiple panels. In addition, in the present disclosure, an operation for a UE to receive a signal from TRP1/TRP2 may be interpreted/described as (or may be) an operation for the UE to receive a signal from the network side (through/using TRP1/TRP2), and an operation for the UE to transmit a signal to TRP1/TRP2 may be interpreted/ described as (or may be) an operation for the UE to transmit a signal to the network side (through/using TRP1/TRP2), and they may be interpreted/described in an inversed manner.

The UE may receive configuration information related to multiple TRP-based transmission and reception through/ using TRP 1 (and/or TRP 2) from a network side (S1905).

That is, the network side may transmit configuration information related to multiple TRP transmission and reception to the UE through/using TRP 1 (and/or TRP 2) (S1905). The configuration information may include information related to the configuration of the network side (i.e., TRP configuration), resource information related to multiple TRP-based transmission and reception (resource allocation), and so on. The configuration information may be delivered through higher-layer signaling (e.g., RRC signaling, MAC-CE, etc.). Also, if the configuration information is predefined or preset, the corresponding step may be omitted.

For example, the configuration information may include CORESET related configuration information (e.g., ControlResourceSet IE) as described in the above-described methods (e.g., proposal 1/proposal 1-1/proposal 2, etc.). The CORESET related configuration information may include a CORESET related ID (e.g., controlResourceSetID), an index of a CORESET pool for CORESET (e.g., CORESET-PoolIndex), time/frequency resource configuration of CORESET, TCI information related to CORESET, and the like. The index of the CORESET pool (e.g., CORESET-PoolIndex) may mean a specific index (e.g., CORESET group Index, HARQ Codebook index) mapped/configured to each CORESET.

For example, according to the above-described methods and/or embodiments (e.g., proposal 1/proposal 1-1/proposal 2), the configuration information may include information about which one of multiple URLLC operations is to be performed. For example, the configuration information may include information configuring one of M-TRP URLLC schemes (e.g., scheme 2a/2b/3/4).

For example, the configuration information may include PTRS related configuration information. The PTRS related configuration information (e.g., PTRS-DownlinkConfig) may include information for a frequency density (e.g., frequencyDensity parameter), information for a time density (e.g., timeDensity parameter), epre-Ratio parameter, a resource element offset parameter (e.g., resourceElementOffset), etc. of the PTRS.

For example, in the above step S1905, an operation in which the UE (100/200 of FIGS. 21 to 25) receives configuration information related to the multiple TRP-based transmission and reception from the network side (100/200 of FIGS. 21 to 25) may be implemented by an apparatus of FIGS. 21 to 25 to be described below. For example, referring to FIG. 22, one or more processors 102 may control one or more transceivers 106 and/or one or more memories 104 to receive the configuration information related to the multiple TRP-based transmission and reception, and one or more transceivers 106 may receive the configuration information related to the multiple TRP-based transmission and reception from the network side.

Similarly, in the above step S1905, an operation in which the network side (100/200 of FIGS. 21 to 25) transmits configuration information related to the multiple TRP-based transmission and reception to the UE (100/200 of FIGS. 21 to 25) may be implemented by an apparatus of FIGS. 21 to 25 to be described below. For example, referring to FIG. 22, one or more processors 102 may control one or more transceivers 106 and/or one or more memories 104 to transmit the configuration information related to the multiple TRP-based transmission and reception, and the configuration information related to the multiple TRP-based transmission and reception is transmitted, by one or more transceivers 106, from the network side.

The UE may receive DCI and Data 1 scheduled by the DCI through/using TRP 1 from the network side (S1910-1). The UE may receive Data 2 through/using TRP 2 from the network side (S1910-2). That is, the network side may transmit DCI and Data scheduled by the DCI to the UE through/using TRP 1 (S1910-1). The network side may also transmit Data 2 to the UE through/using TRP 2 (S1910-2). For example, DCI and Data (e.g., Data 1, Data 2) may be transmitted via a control channel (e.g., PDCCH, etc.) and a data channel (e.g., PDSCH, etc.). Further, the steps S1910-1 and S1910-2 may be performed simultaneously, or one of the steps S1910-1 and S1910-2 may be performed earlier than the other.

For example, the DCI may include a TCI field, antenna port(s) field, a time domain resource assignment field, a frequency domain resource assignment field, an MCS field or an RV field, etc.

For example, as described in the above-described methods and/or embodiments (e.g., proposal 1/proposal 1-1/proposal 2), the DCI may be configured to be used for scheduling for both Data 1 and Data 2, and the Data 1 and the Data 2 may correspond to the same TB.

For example, on the assumption that non-overlapping frequency resources are used, the DCI may include information for a mapping relationship between the frequency resources and TCI states related to different TRPs (e.g., TRP 1, TRP 2). Through this, the UE may understand a mapping relationship between the frequency resource and the TCI state/TRP. For the DCI, the UE may be configured to calculate the TB size (i.e., to interpret a TB related information field) based on a frequency resource according to a predetermined criterion.

For example, as in the above-described proposal 1-1, the frequency density/frequency resource mapping of the PTRS may be determined based on the DCI. If the frequency resources scheduled via the DCI are mapped to different TCI states, the frequency density/frequency resource mapping of the PTRS may be determined depending on a frequency resource (e.g., bandwidth/PRBs) related to each TCI state. Further, in this case, Data 1 and Data 2 may be transmitted and received based on PTRS (port), etc. described in the proposal 1-1.

For example, an operation for the UE (100/200 of FIGS. 21 to 25) of the steps S1910-1/S1910-2 to receive the DCI and/or the Data 1 and/or the Data 2 from the network side (100/200 of FIGS. 21 to 25) may be implemented by the device of FIGS. 21 to 25 to be described below. For example, referring to FIG. 22, one or more processors 102 may control one or more transceivers 106 and/or one or more memories 104 so as to receive the DCI and/or the Data 1 and/or the Data 2, and the one or more transceivers 106 may receive the DCI and/or the Data 1 and/or the Data 2 from the network side.

Similar to this, an operation for the network side (100/200 of FIGS. 21 to 25) of the steps S1910-1/S1910-2 to transmit the DCI and/or the Data 1 and/or the Data 2 to the UE (100/200 of FIGS. 21 to 25) may be implemented by the device of FIGS. 21 to 25 to be described below.

Figure 22:
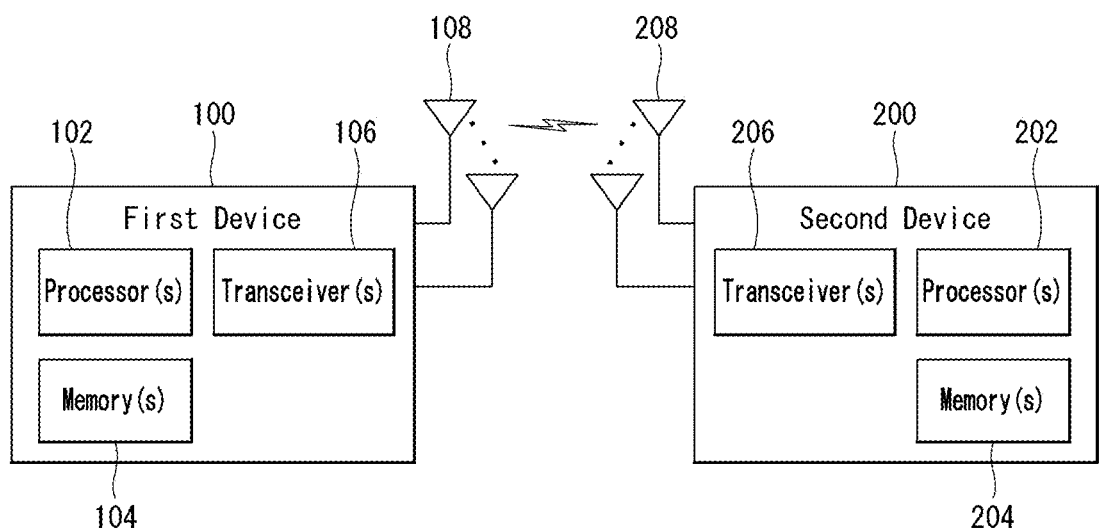
FIG. 22 illustrates a wireless device which may be applied to the present disclosure.

For example, referring to FIG. 22, one or more processors 102 may control one or more transceivers 106 and/or one or more memories 104 so as to transmit the DCI and/or the Data 1 and/or the Data 2, and the one or more transceivers 106 may transmit the DCI and/or the Data 1 and/or the Data 2 to the UE.

The UE may decode the Data 1 and/or the Data 2 receiving from TRP 1 and TRP 2 (S1915). For example, the UE may perform decoding on channel estimation and/or data based on the above-described methods (e.g., proposal 1/proposal 1-1/proposal 2, etc).

For example, based on the above-described proposed methods and/or embodiments (e.g., proposal 1/proposal 2/proposal 3/proposal 4, etc.), the UE can know that the base station has transmitted the same data according to a specific URLLC operation, and may assume that the Data 1 and the Data 2 are the same TB to decode the Data 1 and the Data 2. As an example, the UE may assume that the base station has repeatedly transmitted the same data as many as the number of TCI states indicated via the DCI and may decode the Data 1 and the Data 2. For example, the UE may assume that the base station has repeatedly transmitted the same data in the frequency domain indicated via the DCI and may decode the Data 1 and the Data 2.

For example, an operation for the UE (100/200 of FIGS. 21 to 25) of the step S1915 to decode the Data 1 and the Data 2 may be implemented by the device of FIGS. 21 to 25 to be described below. For example, referring to FIG. 22, one or more processors 102 may control one or more memories 104 so as to decode the Data 1 and the Data 2.

Based on the above-described proposal methods (e.g., proposal 1/proposal 1-1/proposal 2, etc), the UE may transmit HARQ-ACK information (e.g., ACK information, NACK information, etc.) for the DCI and/or the Data 1 and/or the Data 2 on one or more PUCCHs to the network side through/using TRP 1 and/or TRP 2 (S1920-1, S1920-2). That is, based on the above-described proposal methods (e.g., proposal 1/proposal 1-1/proposal 2, etc), the network side may receive HARQ-ACK information (e.g., ACK information, NACK information, etc.) for the DCI and/or the Data 1 and/or the Data 2 from the UE through/using TRP 1 and/or TRP 2 (S1920-1, S1920-2).

For example, HARQ-ACK information for the Data 1 and/or the Data 2 may be combined into one or separated. The UE may be configured to transmit only HARQ-ACK information as a representative TRP (e.g., TRP 1), and transmission of HARQ-ACK information to another TRP (e.g., TRP 2) may be omitted. For example, the HARQ-ACK information may be transmitted via PUCCH and/or PUSCH.

For example, an operation for the UE (100/200 of FIGS. 21 to 25) of the steps S1920-1/S1920-2 to transmit HARQ-ACK information for the Data 1 and/or the Data 2 to the network side (100/200 of FIGS. 21 to 25) on one or more PUCCHs may be implemented by the device of FIGS. 21 to 25 to be described below. For example, referring to FIG. 22, one or more processors 102 may control one or more transceivers 106 and/or one or more memories 104 so as to transmit HARQ-ACK information for the Data 1 and/or the Data 2 on one or more PUCCHs, and the one or more transceivers 106 may transmit the HARQ-ACK information for the Data 1 and/or the Data 2 to the network side.

Similar to this, an operation for the network side (100/200 of FIGS. 21 to 25) of the steps S1920-1/S1920-2 to receive HARQ-ACK information for the Data 1 and/or the Data 2 from the UE (100/200 of FIGS. 21 to 25) on one or more PUCCHs may be implemented by the device of FIGS. 21 to 25 to be described below. For example, referring to FIG. 22, one or more processors 102 may control one or more transceivers 106 and/or one or more memories 104 so as to receive HARQ-ACK information for the Data 1 and/or the Data 2, and the one or more transceivers 106 may receive the HARQ-ACK information for the Data 1 and/or the Data 2 from the UE.

FIG. 19 illustrates mainly the single-DCI based M-TRP operation, but can be applied to a multiple DCI based M-TRP operation, if necessary or desired.

Figure 20:
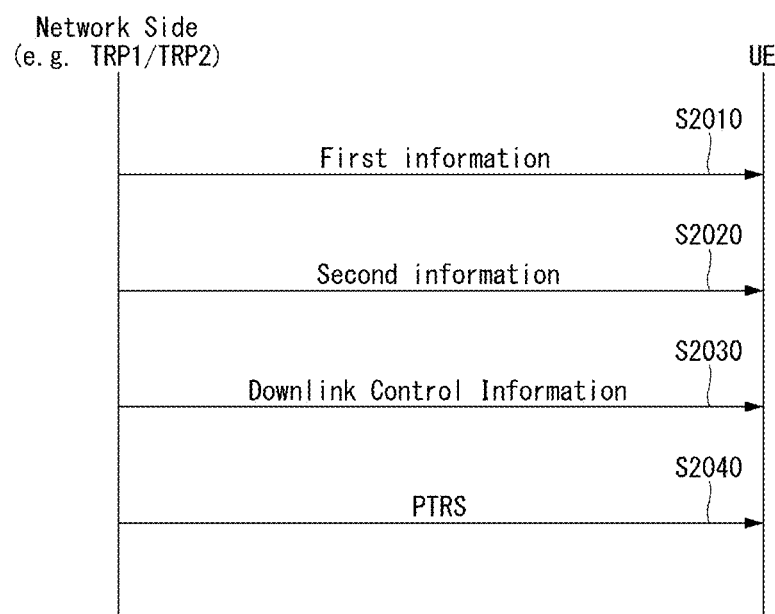
FIG. 20 illustrates an example of PTRS transmission/reception operations between a UE and a base station to which methods and/or embodiments described in the present disclosure are applicable.

FIG. 20 illustrates an example of signaling of PTRS transmission/reception operations between a UE and a base station (BS) to which methods (e.g., proposal 1/proposal 1-1/proposal 2, etc.) described in the present disclosure are applicable. The UE can be supported by a plurality of TRPs, and ideal/non-ideal backhaul may be configured between the plurality of TRPs. FIG. 20 is merely an example for convenience of description and does not limit the scope of the present disclosure. Some step(s) illustrated in FIG. 20 may also be omitted depending on circumstances and/or configurations, etc.

For example, the UE may include one or more transceivers, one or more processors, and one or more memories that store instructions for operations executed by the one or more processors and are connected to the one or more processors.

For example, the base station may mean a generic term for an object performing transmission and reception of data together with the UE. For example, the base station may include one or more transceivers, one or more processors, and one or more memories that store instructions for operations executed by the one or more processors and are connected to the one or more processors. For example, the base station may be a concept including one or more transmission points (TPs), one or more transmission and reception points (TRPs), etc. The TP and/or the TRP may include a panel, a transmission and reception unit, etc. of the base station. As described above, the TRP may be divided according to information (e.g., index, ID) for a CORESET group (or CORESET pool). For example, if one UE is configured to perform transmission and reception with multiple TRPs (or cells), this may mean that multiple CORESET groups (or CORESET pools) are configured to the one UE. The above-described configuration for the CORESET groups (or CORESET pools) may be performed via higher layer signaling (e.g., RRC signaling, etc.).

Although the following description will be given based on the "TRP", as described above, the "TRP" may be applied by being replaced by expressions such as a panel, an antenna array, a cell (e.g., macro cell/small cell/pico cell, etc.), a transmission point (TP), and a base station (e.g., gNB, etc.).

In performing the operation of FIG. 20, it may be assumed that the UE is supported by FDM based M-TRPs. It may also be assumed that a code point mapped to a plurality of TCI states (e.g., TCI state 1 and TCI state 2) is configured to the UE via a TCI field of DCI.

The UE may receive first information configuring one or more bandwidth parts (BWPs), in S2010. That is, the base station may transmit, to the UE, the first information configuring one or more BWPs. The BWP may be configured considering numerology. The BWP may include consecutive resource blocks (RBs) on a frequency axis and may correspond to one numerology (e.g., sub-carrier spacing, CP length, slot/mini-slot duration). For example, multiple BWPs may also be configured within one CC based on the first information.

For example, an operation of the UE/BS (100/200 of FIGS. 21 to 25) in the step S2010 to receive/transmit the first information may be implemented by a device of FIGS. 21 to 25 to be described below. For example, referring to FIG. 22, one or more processors 102 may control one or more transceivers 106 and/or one or more memories 104 so as to receive/transmit the first information, and the one or more transceivers 106 may receive/transmit the first information.

The UE may receive second information related to the PTRS, in S2020. That is, the base station may transmit, to the UE, the second information related to the PTRS. For example, the second information may be received via RRC signaling. The step S2020 may be performed together with the step S2010.

For example, the second information may refer to PTRS configuration information (i.e., PTRS-DownlinkConfig IE). The PTRS configuration information (e.g., PTRS-DownlinkConfig) may include information for a frequency density (e.g., frequencyDensity parameter), information for a time density (e.g., timeDensity parameter), epre-Ratio parameter, a resource element offset parameter (e.g., resourceElementOffset), etc. of the PTRS. For example, the information for the frequency density of the PTRS (i.e., frequency density parameter) may include threshold information for the frequency density of the PTRS. The threshold information may include thresholds (e.g., a first threshold and a second threshold) of a bandwidth for determining the frequency density of the PTRS. As an example, considering M-TRP transmission, each of the first threshold and the second threshold may be set as a plurality of values. In other words, the thresholds for determining the frequency density of the PTRS for each TRP may be differently set.

For example, an operation of the UE/BS (100/200 of FIGS. 21 to 25) in the step S2020 to receive/transmit the second information may be implemented by the device of FIGS. 21 to 25 to be described below. For example, referring to FIG. 22, one or more processors 102 may control one or more transceivers 106 and/or one or more memories 104 so as to receive/transmit the second information, and the one or more transceivers 106 may receive/transmit the second information.

The UE may receive downlink control information (DCI), in S2030. That is, the base station may transmit, to the UE, the DCI. The DCI may be transmitted via a control channel (e.g., PDCCH).

The DCI may include i) a bandwidth indication field (e.g., first field) and ii) transmission configuration indication (TCI) field (e.g., second field). Among one or more BWPs configured based on the first information, an active BWP may be indicated by the first field. The DCI may further include at least one of a frequency resource assignment field (e.g., third field) or an antenna port field (e.g., fourth field).

For example, code points corresponding to one or more TCI states may be indicated based on the TCI field (e.g., the second field). For example, code points to which a plurality of TCI states (e.g., TCI state 1 and TCI state 2) are mapped may be configured/indicated based on the TCI field of the DCI.

For example, a plurality of state information related to a combination of the number of CDM groups without data and DMRS ports may be predefined, and specific state information (or value) of the plurality of state information may be indicated via an antenna port field of the DCI. As an example, the state information may mean DMRS port related information (e.g., 3GPP TS38.212 Table 7.3.1.2.2-1/2/3/4, etc.). A mapping relationship between the DMRS ports and the CDM groups may be predefined. The DMRS ports and the number of CDM groups including the DMRS ports may be determined through the indicated specific state information (or value). For example, the DMRS ports of the same CDM group may be indicated based on the antenna port field.

For example, frequency resources for all the M-TRPs operating in NCJT may be allocated based on the frequency resource assignment field (e.g., third field) (e.g., FRA method 1). All the frequency resources allocated based on the above-described proposed methods and/or embodiments (e.g., proposal 1/proposal 1-1/proposal 1-2, etc.) may be divided and allocated for each TRP. The frequency resources allocated based on the third field may be divided into non-overlapping resource groups corresponding to the number of the plurality of TCI states. Each resource group and each TCI state may correspond to each other.

For example, all the frequency resources assigned on a per PRG or PRG set basis may be divided. If precoding granularity is configured/indicated to the UE as 2 or 4, even-numbered PRGs/PRG sets (e.g., first region) may be allocated to TRP 1, and odd-numbered PRGs/PRG sets (e.g., second region) may be allocated to TRP 2. As another example, all the frequency resources assigned on a per RB or RB set basis may be divided. If precoding granularity is configured/indicated to the UE as wideband, resources may be divided by floor (all the allocated resources/2) to evenly distribute resources for each TRP.

A plurality of TCI states indicated via the TCI field of DCI may be mapped to the frequency resource domain assigned based on the frequency resource assignment field. For example, the assigned frequency resource domain may include a first region and a second region that do not overlap in the frequency domain. That is, the frequency resource domain assigned via DCI may be divided into the first region and the second region. The first region may be related to a first TCI state, and the second region may be related to a second TCI state. In this case, a first frequency density of the PTRS may be determined by the number of resource blocks in the first region, and a second frequency density of the PTRS may be determined by the number of resource blocks in the second region.

For example, if frequency resources for all the M-TRPs operating in NCJT are allocated based on the frequency resource assignment field, and frequency resources for specific TRPs need to be considered to calculate a TB size, the frequency resources for the specific TRPs for the TB size calculation may be indicated from the base station or determined by a predefined rule.

As another example, a frequency resource for a specific TRP among the M-TRPs operating in NCJT may be assigned based on the frequency resource assignment field (e.g., FRA method 2). A frequency resource for other TRP performing the NCJT based on the frequency resource assigned for the specific TRP may be determined based on the above-described proposed methods and/or embodiments (e.g., proposal 1/proposal 1-1/proposal 1-2, etc.). For example, the frequency resource for the other TRP may have the same size as a resource assigned via DCI and may be assigned by being concatenated with the resource assigned via DCI. Alternatively, a difference value from the resource assigned via DCI may be configured via separate signaling (e.g., DCI).

For example, when a frequency resource for a specific TRP among the M-TRPs operating in NCJT is assigned based on the frequency resource assignment field, and a frequency resource for other TRP uses the resource assigned via DCI, if frequency resources for all the TRPs need to be considered to calculate the TB size, the TB size may be calculated using a frequency resource size obtained by multiplying the resource size scheduled via DCI by the number of TCI states.

For example, an operation of the UE/BS (100/200 of FIGS. 21 to 25) in the step S2030 to receive/transmit the downlink control information (DCI) may be implemented by the device of FIGS. 21 to 25 to be described below. For example, referring to FIG. 22, one or more processors 102 may control one or more transceivers 106 and/or one or more memories 104 so as to receive/transmit the DCI, and the one or more transceivers 106 may receive/transmit the DCI.

The UE may receive the PTRS in the active BWP, in S2040. That is, the base station may transmit, to the UE, the PTRS in the active BWP.

For example, the PTRS may be mapped to time and/or frequency resource and received. The PTRSs may be mapped to the resource element in the frequency domain at a predetermined spacing. The spacing (e.g., the number of RBs) between the PTRSs may mean the frequency density of the PTRS. The frequency density of the PTRS may be determined depending on a scheduled bandwidth.

For example, based on (i) a plurality of TCI states being indicated based on the TCI field of the DCI (e.g., the second field) and (ii) non-overlapping resources in a frequency domain related to each TCI state of the plurality of TCI states, the frequency density of the PTRS may be determined by (i) the number of resource blocks related to each TCI state and (ii) the threshold information included in the second information.

As a detailed example, the frequency density of the PTRS may be determined by comparing at least one of thresholds (e.g., a first threshold and a second threshold) set through the threshold information included in the second information with the number of resource blocks related to each TCI state.

For example, as described above, based on two TCI states being indicated based on the TCI field of the DCI (e.g., the second field), the frequency resources allocated via the DCI may be divided into a first resource group and a second resource group that do not overlap. The first resource group DCI may be related to the first TCI state, and the second resource group DCI may be related to the second TCI state. Each resource group may include one or more resource blocks. A first frequency density of the PTRS may be determined by the number of resource blocks of the first resource group, and a second frequency density of the PTRS may be determined by the number of resource blocks of the second region. In the first resource group, the PTRS may be mapped to a resource element based on the first frequency density, and in the second resource group, the PTRS may be mapped to a resource element based on the second frequency density.

The UE can perform compensation for a phase noise using the received PTRS.

For example, an operation of the UE/BS (100/200 of FIGS. 21 to 25) in the step S2040 to receive/transmit the PTRS may be implemented by the device of FIGS. 21 to 25 to be described below. For example, referring to FIG. 22, one or more processors 102 may control one or more transceivers 106 and/or one or more memories 104 so as to receive/transmit the PTRS, and the one or more transceivers 106 may receive/transmit the PTRS.

As mentioned above, the above-described network side/UE signaling and operation (e.g., the proposal 1/proposal 1-1/proposal 2/FIG. 19/FIG. 20, etc.) may be implemented by a device to be described below (e.g., FIGS. 21 to 25). For example, the network side (e.g., TRP 1/TRP 2) may correspond to a first wireless device, and the UE may correspond to a second wireless device. In some cases, the reverse may also be considered. For example, a first device (e.g., TRP 1)/second device (e.g., TRP 2) may correspond to a first wireless device, and the UE may correspond to a second wireless device. In some cases, the reverse may also be considered.

For example, the above-described network side/UE signaling and operation (e.g., the proposal 1/proposal 1-1/proposal 2/FIG. 19/FIG. 20, etc.) may be processed by one or more processors (e.g., 102 and 202) of FIGS. 21 to 25. The above-described network side/UE signaling and operation (e.g., the proposal 1/proposal 1-1/proposal 2/FIG. 19/FIG. 20, etc.) may be stored in one or more memories (e.g., 104 and 204) in the form of a command/program (e.g., instruction, executable code) for running at least one processor (e.g., 102 and 202) of FIGS. 21 to 25.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
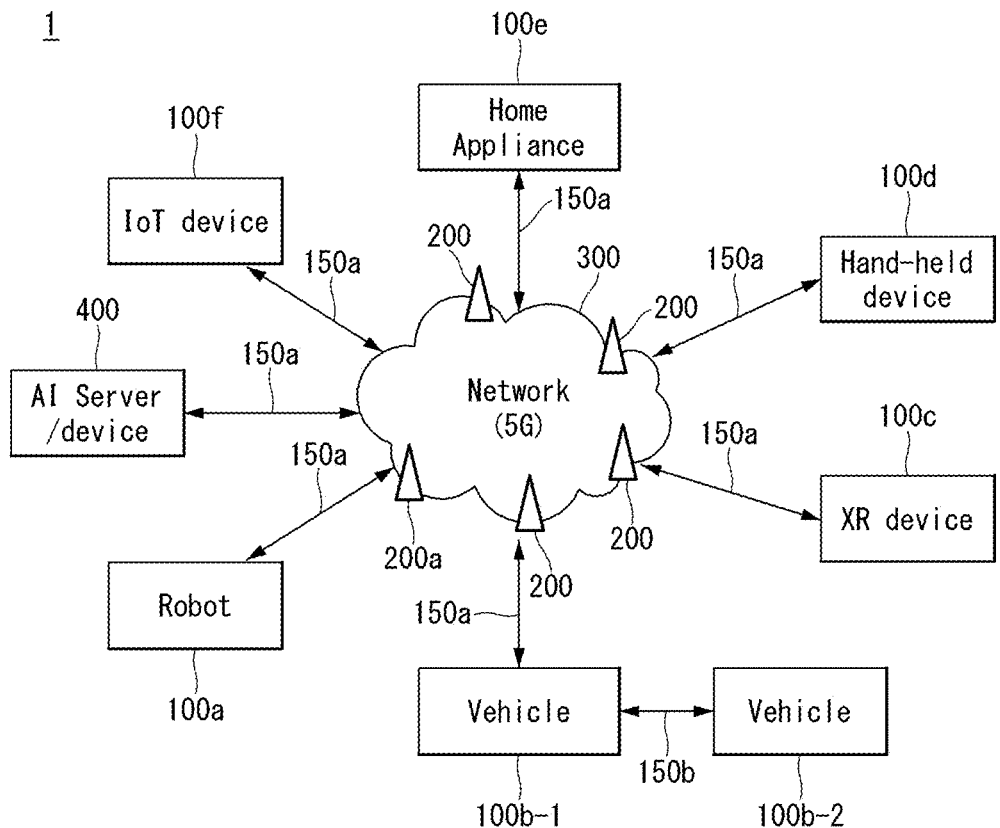
FIG. 21 illustrates a communication system 1 applied to the present disclosure.

FIG. 21 illustrates a communication system 1 applied to the present disclosure.

Referring to FIG. 21, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1010a, vehicles 1010b-1 and 1010b-2, an eXtended Reality (XR) device 1010c, a hand-held device 1010d, a home appliance 1010e, an Internet of Things (IoT) device 1010f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 1010a to 1010f may be connected to the network 300 via the BSs 1020. An A technology may be applied to the wireless devices 1010a to 1010f and the wireless devices 1010a to 1010f may be connected to the AI server 400 via the network 300. The network 300 may be configured using a 3G network, a 4G (e.g., LTE) network, or a 5G (e.g., NR) network. Although the wireless devices 1010a to 1010f may communicate with each other through the BSs 1020/network 300, the wireless devices 1010a to 1010f may perform direct communication (e.g., sidelink communication) with each other without passing through the BSs/network. For example, the vehicles 1010b-1 and 1010b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1010a to 1010f.

Wireless communication/connections 150a, 150b, or 150c may be established between the wireless devices 1010a to 1010f/BS 1020, or BS 1020/BS 1020. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 1010x and the BS 1020} and/or {the wireless device 1010x and the wireless device 1010x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Disclosure is Applied

Figure 23:
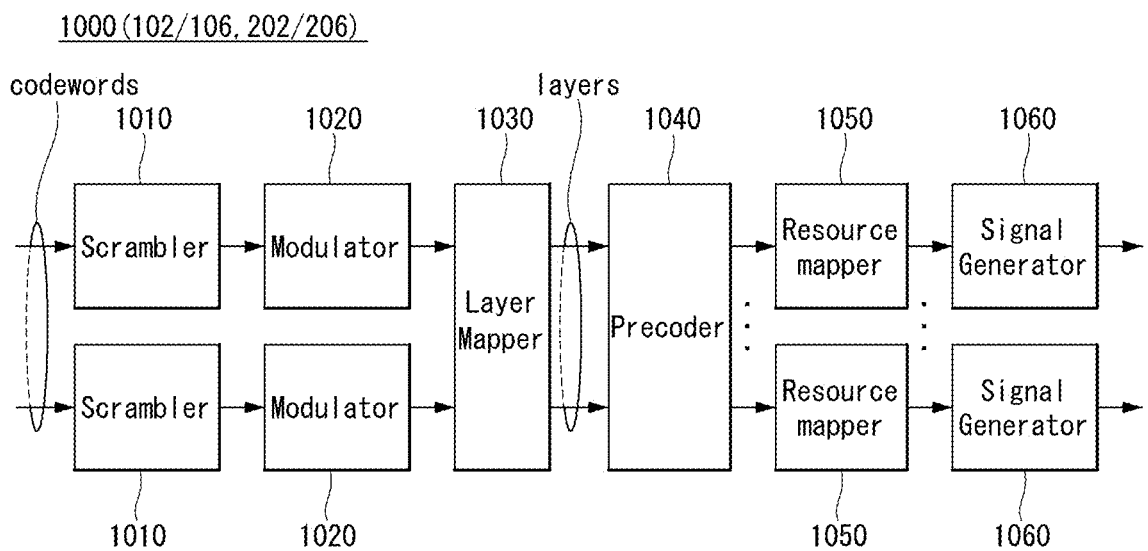
FIG. 23 illustrates a signal processing circuit for a transmit signal.

FIG. 23 illustrates a signal processing circuit for a transmit signal.

Referring to FIG. 23, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 23 may be performed by the processors 102 and 202 and/or the transceivers 106 and 206 of FIG. 22. Hardware elements of FIG. 23 may be implemented in the processors 102 and 202 and/or the transceivers 106 and 206 of FIG. 22. For example, blocks 1010 to 1060 may be implemented in the processors 102 and 202 of FIG. 22. Further, blocks 1010 to 1050 may be implemented in the processors 102 and 202 of FIG. 22 and the block 1060 of FIG. 22 and the block 2060 may be implemented in the transceivers 106 and 206 of FIG. 22.

A codeword may be transformed into a radio signal via the signal processing circuit 1000 of FIG. 23. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device.

The scrambled bit sequence may be modulated into a modulated symbol sequence by the modulator 1020. A modulation scheme may include pi/2-BPSK (pi/2-Binary Phase Shift Keying), m-PSK (m-Phase Shift Keying), m-QAM (m-Quadrature Amplitude Modulation), etc.

A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 23. For example, the wireless device (e.g., 100 or 200 of FIG. 22) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

Figure 24:
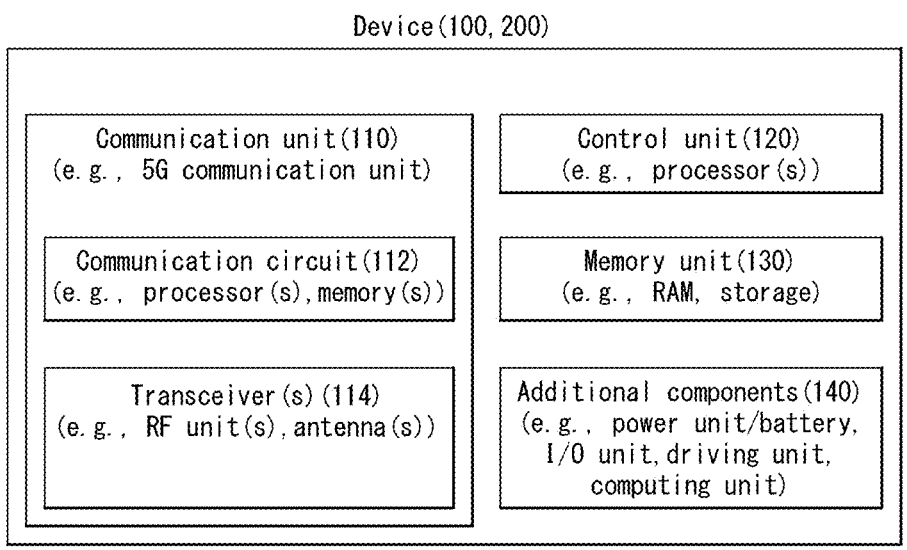
FIG. 24 illustrates another example of a wireless device applied to the present disclosure.

FIG. 24 illustrates another example of a wireless device applied to the present disclosure. The wireless device may be implemented in various forms according to a use-case/service (see FIG. 21).

Referring to FIG. 24, wireless devices 1010 and 1020 may correspond to the wireless devices 100 and 200 of FIG. 22 and may be configured by various elements, components, units/portions, and/or modules. For example, each of the wireless devices 1010 and 2010 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 22. For example, the transceiver(s) 114 may include the one or more transceivers 106 and 106 and/or the one or more antennas 108 and 108 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (1010*a* of FIG. 21), the vehicles (1010*b*-1 and 1010*b*-2 of FIG. 21), the XR device (1010*c* of FIG. 21), the hand-held device (1010*d* of FIG. 21), the home appliance (1010*e* of FIG. 21), the IoT device (1010f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (1020 of FIG. 21), a network node, etc. The wireless device may be used in a mobile or fixed place according to a use-example/service.

In FIG. 22, the entirety of the various elements, components, units/portions, and/or modules in the wireless devices 100 and 100 may be connected to each other through a wired interface or at least a part thereof may be wirelessly connected through the communication unit 110. For example, in each of the wireless devices 100 and 100, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 100 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Disclosure is Applied

Figure 25:
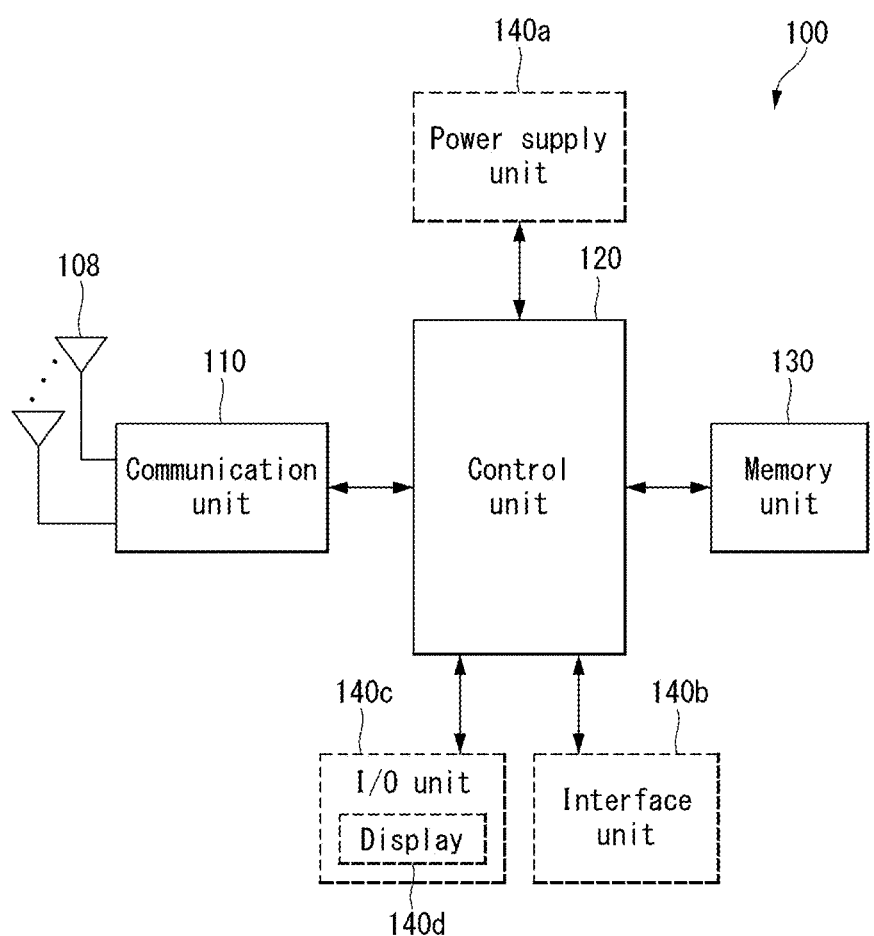
FIG. 25 illustrates a portable device applied to the present disclosure.

FIG. 25 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 25, a portable device 1010 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 24, respectively.

The communication unit 110 may transmit/receive a signal (e.g., data, a control signal, etc.) to/from another wireless device and eNBs. The control unit 120 may perform various operations by controlling components of the portable device 1010. The control unit 120 may include an Application Processor (AP). The memory unit 130 may store data/parameters/programs/codes/instructions required for driving the portable device 1010. Further, the memory unit 130 may store input/output data/information, etc. The power supply unit 140a may supply power to the portable device 1010 and include a wired/wireless charging circuit, a battery, and the like. The interface unit 140b may support a connection between the portable device 1010 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Here, wireless communication technology implemented in wireless devices 100 and 200 of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100 and 200 of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally or alternatively, the wireless communication technology implemented in the wireless devices 100 and 200 of the present disclosure may includes at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

Although a method of transmitting and receiving a PTRS in a wireless communication system according to the present disclosure has been described focusing on examples applying to 3GPP LTE/LTE-A system and 5G system (new RAT system), the method can also be applied to other various wireless communication systems.

The invention claimed is:

1. A method of receiving, by a user equipment (UE), a physical downlink shared channel (PDSCH) in a wireless communication system, the method comprising:
   receiving configuration information via a RRC signaling, wherein the configuration information includes information related to the PDSCH;
   receiving downlink control information (DCI) scheduling the PDSCH, based on the configuration information,
   wherein the DCI includes (i) a frequency domain resource assignment field, (ii) a transmission configuration indication (TCI) field and (iii) an antenna port field; and
   receiving the PDSCH in resource blocks assigned based on the frequency domain resource assignment field,
   wherein, based on a first TCI state and a second TCI state being indicated via the TCI field, the assigned resource blocks include (i) first resource blocks related to the first TCI state and (ii) second resource blocks related to the second TCI state,
   wherein the first resource blocks and the second resource blocks do not overlap with each other in the assigned resource blocks,
   wherein the method further comprises receiving a phase tracking reference signal (PTRS),
   wherein the PTRS is mapped to a resource element and is received, and
   wherein, based on (i) resource blocks related to each of the plurality of TCI states not overlapping with each other in the assign resource blocks, (ii) one or more demodulation reference signal (DMRS) ports within a same code division multiplexing (CDM) group being indicated based on the antenna port field and (iii) an antenna port of the PTRS being related to a DMRS port with a lowest index among the one or more DMRS ports:
   (a) for each of the plurality of TCI states, a frequency density of the PTRS is determined based on a number of resource blocks related to each of the plurality of TCI states,
   (b) a resource element mapping of the PTRS is associated with the resource blocks related to each of the plurality of TCI states.

2. The method of claim 1, wherein the PDSCH is received based on a frequency division multiplexing (FDM) scheme.

3. The method of claim 2, wherein a first transport block related to the first TCI state and a second transport block related to the second TCI state are received via the PDSCH, and
   wherein the first transport block and the second transport block are the same.

4. The method of claim 3, wherein a first frequency density of the PTRS is determined based on the number of the first resource blocks, and a second frequency density of the PTRS is determined based on the number of the second resource blocks.

5. The method of claim 4, wherein the resource block includes one or more resource elements,
   wherein the PTRS is mapped to resource elements of the first resource blocks based on the first frequency density, and
   wherein the PTRS is mapped to resource elements of the second resource blocks based on the second frequency density.

6. The method of claim 1, wherein based on a precoding granularity being configured as a wideband, the first resource blocks are determined based on a ceiling function taking the assigned resource blocks of the frequency domain/2 as an argument, and the second resource blocks are determined as remaining resource blocks excluding the first resource blocks.

7. The method of claim 1, wherein based on a precoding granularity being configured as 2 or 4, the first resource blocks constitute even-numbered precoding resource block groups (PRGs), and the second resource blocks constitute odd-numbered PRGs.

8. A user equipment (UE) receiving a physical downlink shared channel (PDSCH) in a wireless communication system, the UE comprising:
   one or more transceivers;
   one or more processors; and
   one or more memories configured to store instructions for operations executed by the one or more processors, the one or more memories being connected to the one or more processors,
   wherein the operations comprise:
   receiving configuration information via a RRC signaling, wherein the configuration information includes information related to the PDSCH;
   receiving downlink control information (DCI) scheduling the PDSCH, based on the configuration information,
   wherein the DCI includes (i) a frequency domain resource assignment field, (ii) a transmission configuration indication (TCI) field and (iii) an antenna port field; and
   receiving the PDSCH in resource blocks assigned based on the frequency domain resource assignment field,
   wherein, based on a first TCI state and a second TCI state being indicated via the TCI field, the assigned resource blocks include (i) first resource blocks related to the first TCI state and (ii) second resource blocks related to the second TCI state, wherein the first resource blocks and the second resource blocks do not overlap with each other in the assigned resource blocks, wherein the operations further comprise receiving a phase tracking reference signal (PTRS), wherein the PTRS is mapped to a resource element and is received, wherein, based on (i) resource blocks related to each of the plurality of TCI states not overlapping with each other in the assigned resource blocks, (ii) one or more demodulation reference signal (DMRS) ports within a same code division multiplexing (CDM) group being indicated based on the antenna port field and (iii) an antenna port of the PTRS being related to a DMRS port with a lowest index among the one or more DMRS ports:

(a) for each of the plurality of TCI states, a frequency density of the PTRS is determined based on a number of the resource blocks related to each of the plurality of TCI states, and (b) a resource element mapping of the PTRS is associated with the resource blocks related to each of the plurality of TCI states.

9. A method of transmitting, by a base station, a physical downlink shared channel (PDSCH) in a wireless communication system, the method comprising:

transmitting, to a user equipment (UE), configuration information via a RRC signaling, wherein the configuration information includes information related to the PDSCH;

transmitting, to the UE, downlink control information (DCI) scheduling the PDSCH, based on the configuration information, wherein the DCI includes (i) a frequency domain resource assignment field, (ii) a transmission configuration indication (TCI) field and (iii) an antenna port field; and transmitting, to the UE, the PDSCH in resource blocks assigned based on the frequency domain resource assignment field, wherein, based on a first TCI state and a second TCI state being indicated via the TCI field, the assigned resource blocks include (i) first resource blocks related to the first TCI state and (ii) second resource blocks related to the second TCI state, wherein the first resource blocks and the second resource blocks do not overlap with each other in the assigned resource blocks, wherein the method further comprises transmitting a phase tracking reference signal (PTRS), wherein the PTRS is mapped to a resource element and is received, and wherein, based on (i) resource blocks related to each of the plurality of TCI states not overlapping with each other in the assigned resource blocks, (ii) one or more demodulation reference signal (DMRS) ports within a same code division multiplexing (CDM) group being indicated based on the antenna port field and (iii) an antenna port of the PTRS being related to a DMRS port with a lowest index among the one or more DMRS ports:

(a) for each of the plurality of TCI states, a frequency density of the PTRS is determined based on a number of the resource blocks related to each of the plurality of TCI states, and (b) a resource element mapping of the PTRS is associated with the resource blocks related to each of the plurality of TCI states.

10. The method of claim 9, wherein the PDSCH is received based on a frequency division multiplexing (FDM) scheme.

11. The method of claim 10, wherein a first transport block related to the first TCI state and a second transport block related to the second TCI state are received via the PDSCH, and wherein the first transport block and the second transport block are the same.

12. The method of claim 11, wherein a first frequency density of the PTRS is determined based on the number of the first resource blocks, and a second frequency density of the PTRS is determined based on the number of the second resource blocks.

13. The method of claim 12, wherein the resource block includes one or more resource elements, wherein the PTRS is mapped to resource elements of the first resource blocks based on the first frequency density, and wherein the PTRS is mapped to resource elements of the second resource blocks based on the second frequency density.

14. The method of claim 9, wherein based on a precoding granularity being configured as a wideband, the first resource blocks are determined based on a ceiling function taking the assigned resource blocks of the frequency domain/2 as an argument, and the second resource blocks are determined as remaining resource blocks excluding the first resource blocks.

15. The method of claim 9, wherein based on a precoding granularity being configured as 2 or 4, the first resource blocks constitute even-numbered precoding resource block groups (PRGs), and the second resource blocks constitute odd-numbered PRGs.

* * * * *